(12) United States Patent
Zver et al.

(10) Patent No.: US 7,281,221 B2
(45) Date of Patent: Oct. 9, 2007

(54) WORK CELL PROBLEM IDENTIFICATION AND NOTIFICATION SYSTEM

(75) Inventors: Ronald J. Zver, Zurich, IL (US); Nicholas P. Fowler, Hawthorne Woods, IL (US)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 776 days.

(21) Appl. No.: 10/310,459

(22) Filed: Dec. 5, 2002

(65) Prior Publication Data

US 2003/0117439 A1 Jun. 26, 2003

Related U.S. Application Data

(60) Provisional application No. 60/337,424, filed on Dec. 5, 2001.

(51) Int. Cl.
*G06F 19/00* (2006.01)
*G06F 15/16* (2006.01)

(52) U.S. Cl. .................. 715/846; 715/740; 715/837

(58) Field of Classification Search ........ 715/734–739, 715/839, 837, 838, 861, 968, 847, 740, 771–773, 715/856; 701/117, 118; 709/224
See application file for complete search history.

(56) References Cited

U.S. PATENT DOCUMENTS

| | | | | |
|---|---|---|---|---|
| 5,631,825 A | 5/1997 | Van Weele et al. | ........ | 364/188 |
| 5,737,727 A | 4/1998 | Lehmann et al. | ........ | 705/7 |
| 5,799,191 A | 8/1998 | Moriyasu et al. | ........ | 395/682 |
| 5,805,166 A | 9/1998 | Hall, Jr. et al. | ........ | 345/349 |
| 5,873,095 A | 2/1999 | Gore | ........ | 707/200 |
| 5,918,233 A | 6/1999 | La Chance et al. | ........ | 707/104 |
| 5,948,054 A | 9/1999 | Nielsen | ........ | 709/200 |
| 6,006,171 A | 12/1999 | Vines et al. | ........ | 702/184 |
| 6,069,629 A | 5/2000 | Paterson et al. | ........ | 345/349 |
| 6,275,809 B1 | 8/2001 | Tamaki et al. | ........ | 705/8 |
| 6,317,701 B1 | 11/2001 | Pyotsia et al. | ........ | 702/188 |
| 6,336,053 B1 | 1/2002 | Beatty | ........ | 700/108 |
| 6,343,238 B1 | 1/2002 | Kudo | ........ | 700/108 |
| 6,396,516 B1 | 5/2002 | Beatty | ........ | 345/764 |
| 6,430,614 B1 | 8/2002 | Cucchiara | ........ | 709/223 |
| 6,622,082 B1 * | 9/2003 | Schmidt et al. | ........ | 701/117 |
| 6,801,822 B1 * | 10/2004 | Fujiwara et al. | ........ | 700/108 |
| 2001/0003191 A1 * | 6/2001 | Kovacs et al. | ........ | 709/226 |
| 2002/0077787 A1 * | 6/2002 | Rappaport et al. | ........ | 702/188 |
| 2002/0138479 A1 * | 9/2002 | Bates et al. | ........ | 707/5 |
| 2002/0161885 A1 * | 10/2002 | Childers et al. | ........ | 709/224 |
| 2003/0097421 A1 * | 5/2003 | Wille et al. | ........ | 709/217 |
| 2004/0083125 A1 * | 4/2004 | Almeida et al. | ........ | 705/4 |

* cited by examiner

*Primary Examiner*—Steven Sax

(57) ABSTRACT

The present invention generally relates to a network based graphical user interface allowing individuals at a facility such as a factory work to efficiently communicate problems at the facility in real time. The graphical user interface of is comprised of one or more icons, with each icon representing a work site in a facility. Using the icons, workers at a work site can quickly communicate problems about the work site. The present invention allows managers at the facility to use the same graphical interface to drill down and quickly obtain information about potential problems in the facility. The present invention also allows managers to predesignate departments or individuals to respond to different types of problems at a work site, so that when a worker at a work site identifies a problem, notifications may be sent out in real-time to the department or individuals that need to respond to the problem.

19 Claims, 23 Drawing Sheets

Factory Status Board Administration

Issues Daily Report for Friday, November 15, 2002 To Monday, November 25, 2002

View issues report:
From: 11/15/2002    To: 11/25/2002    [Get Report]
(format MM/DD/YY)

Cell Maintenance:
View/Edit Cell Assignments

User Maintenance:
Add/Disable/Modify User
View Out of office Users
View User Assignments
Enable/Disable Password Checking Reports:
Issues Daily Report
Response Time
Issue Resolution Time
Total Issues

| New Issues | Open Red Issues | Open Yellow Issues | Closed Issues | Data |
|---|---|---|---|---|
| 3 | 3 | 14 | 4 | 11/15/2002 |
| 0 | 3 | 14 | 0 | 11/16/2002 |
| 0 | 3 | 14 | 0 | 11/17/2002 |
| 4 | 4 | 12 | 4 | 11/18/2002 |
| 4 | 4 | 11 | 5 | 11/19/2002 |
| 3 | 4 | 10 | 4 | 11/20/2002 |
| 7 | 7 | 11 | 3 | 11/21/2002 |
| 2 | 5 | 11 | 5 | 11/22/2002 |
| 0 | 5 | 10 | 1 | 11/23/2002 |
| 0 | 5 | 10 | 0 | 11/24/2002 |
| 1 | 2 | 10 | 3 | 11/25/2002 |

| VUP C | |
|---|---|
| Issue # | Description |
| 1991 | 1) Problem with seat force, numerous valves which have the seat, 599 02590 |
| + 2105 | 1) Problem with the VUP C Bonnet assembly, 599-02910...Internal components a |
| + 2128 | 1) VUP C Automatic assembly machine...the seat assembly & stacking station |
| + 2131 | 1) Issue, 16 VUP-C bonnets made last night were checked by me this morning |
| + 2141 | 1) Please check & fine-tune the VUP-C automatic "C" Clip load assembly, #36 |
| + 2163 | 1) New VUP-C springs 599-02903(yellow paint) have blobs of paint (TECHNIC) |

[Add Issue]  [Cancel]

| VUP C | RS 540 | TH 192 | DAMP 3 | GAP MED | GAP BABY | TT 1B4 | VUP A |
| 6 | 1 | 1 | 1 | 1 | 1 | 1 | 3 |

Total open Issues: 18

WORK CELL PROBLEM IDENTIFICATION AND NOTIFICATION SYSTEM

This application claims the priority to and the benefit of Provisional Application Ser. No. 60/337,424 titled "Work Cell Problem Identification and Notification System" filed Dec. 5, 2001.

FIELD OF THE INVENTION

The invention generally relates to a network based graphical user interface allowing individuals at a facility such as a factory work to efficiently communicate problems at the facility in real time. The graphical user interface of is comprised of one or more icons, with each icon representing a work site in a facility. Using the icons, workers at a work site can quickly communicate problems about the work site. The present invention allows managers at the facility to use the same graphical interface to drill down and quickly obtain information about potential problems in the facility. The present invention also allows managers to predesignate departments or individuals to respond to different types of problems at a work site, so that when a worker at a work site identifies a problem, notifications may be sent out in real-time to the department or individuals that need to respond to the problem.

BACKGROUND OF THE INVENTION

Prior computer based systems are known that track, control and report information related to the operation of a physical locality, such as a factory, are known in the art. What is needed is graphical user interface accessible to a plurality of users over a network which allows users to drill down and obtain detailed information about a work site quickly. What is further needed is a system that provides for the immediate notification to necessary personnel using various methods to respond to an issue at a work site and may also continue transmitting notifications to different individuals or groups of individuals on a predetermined basis until the issue is solved.

SUMMARY OF THE INVENTION

The present invention relates to a system and method for documenting and managing daily issues effecting the operation of work environment such as a manufacturing facility, and for assigning and notifying key personnel about potential problems within the work environment. Manufacturing management may use the present invention to obtain a dynamic visual evaluation of the factory operations at any time during the day. Further, using the present invention, managers can predetermine which departments or individuals are to be notified about particular types of problems for each work cell. In a work environment, such as manufacturing facility, the work environment is generally divided up into more than work cell, work group or work site. A work cell is a dedicated space in the factory, focused on manufacturing a single product or family of products. All inventory, assembly machines, testers needed are self contained with the cell. Workers are trained to build the family of products. Workers can flex into the cell for a shift, build a product to satisfy today's needs and then move to another cell. In the preferred embodiment, the present invention is comprised of a graphical user interface comprised of one or more icons, wherein each icon represents a work site in a physical location, such as a factory. These icons can be directly used to enter information about a work site or to view information about a work site, reducing time needed to enter or respond to a problem at a work site. Information for each work site represented by an icon, including description of problem entered and departments to be contacted are stored in a database, accessible through a network. The advantage of using a network such as the Internet, LAN, WAN or Intranet to implement the present invention is that it eliminates the need to install additional software on each computer system to implement the present invention.

In another embodiment, each icon can be divided into a plurality of segments, each segment visually representing an aspect of the work site. For example, a segment can represent the inventory status of the work site; one or more segments can be used to represent individual or groups of assembly machines. Other segments may represent the work status of key individuals.

For each work site, there may be more than one open issue at a time. When a user clicks on a icon, a list of links are provided allowing a user to drill down and obtain further information about the status of problems at a work site. A user can select a link to get a description of the employee that identified the issue and a description of the problem. Further, the user can update an issue by typing in a description of action to be taken, or can close an issue, so that the appearance of the icon will change. The ability for users, such as factory managers, to quickly drill down and obtain any information related to a work site using icons representing the work sites is an important improvement over prior systems.

The number displayed within each status block indicates the number of open issues for that status block. These open issues can include, but are not limited to testing, manufacturing, production control, quality assurance or maintenance. With open issues, the system requires a response to the issue to be entered before the issue can be closed. This aspect of the invention reduces the likelihood that a problem at a work site will be forgotten.

Another embodiment of the present invention provides for notification of one or more individuals about an issue of work site using the graphical user interface of the present invention. After selecting an icon for which an issue will open, the user is provided with the option of selecting individuals or entire departments to be notified about the problem. These departments can include, but are not limited to maintenance, engineering, production, and quality assurance. When a potential problem is identified, a preassigned department is designated to respond to the potential problem. In this way, a user at a work site need not go through the time consuming process of selecting a department to notify about a problem at the work site and notifications are sent out to designated members of the department in real-time. These notifications can be in any form, and can include email, voice mail, paging or an automatic address over a public address system. If these notifications are not responded to, a second set of notifications are sent out to a second group of individuals distinct from the first group of individuals contacted. During a typical day, assignments will change based on the shift. The present invention provides the ability of storing a default responsibility list for each shift, and automatically using the list based on time of day. In another embodiment of the present invention, an icon may be provided that is not assigned to a particular location, but allows a user to enter a problem not necessarily related to a specific work site, and notify whichever departments or individuals they so choose.

BRIEF DESCRIPTION OF THE DRAWINGS

For a better understanding of the present invention, together with other and future objects, advantages and capabilities thereof, reference is made to the accompanying drawings which are incorporated herein by reference and in which:

FIG. 6 illustrates a management entry screen allowing a manager to add or edit information about users;

FIG. 9 illustrates a report screen comprised of an issues daily report;

FIG. 14 illustrates a display on the user interface of the present invention allowing a user to add information about a work site or use links to view information about a work site using the user interface of the present invention;

FIG. 15 illustrates a form a user may fill out to enter information about a work site after a user has elected to add an issue about a work site using the user interface of the present invention;

FIG. 16 illustrates how a user may select a department to notify about an issue using the user interface of the present invention;

FIG. 17 illustrates how a user may confirm new entry regarding a work site.

FIG. 19 illustrates how a user may enter an update regarding a pending issue using the user interface of the present invention;

DETAILED DESCRIPTION OF THE INVENTION

Figure 1:
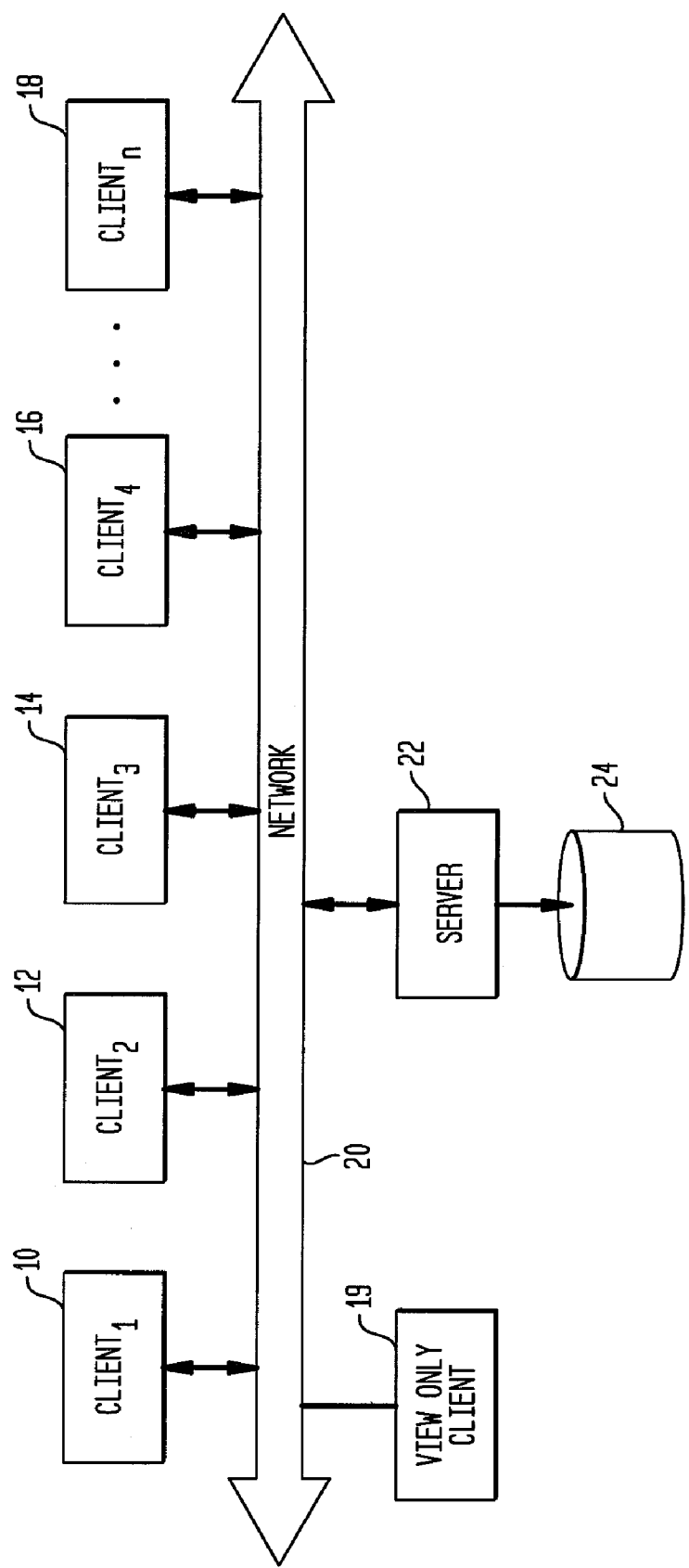
FIG. 1 represents a block diagram of a network system in accordance with the invention.

FIGS. 1-4 illustrate a data processing system in which a user interfaces according to the present invention may be utilized. Most computer networks are designed around the "client-server" methodology. FIG. 1 illustrates a basic client-server computer network configuration. In FIG. 1, a client computer system 10, 12, 14, 16, 18 is connected to a communication network 20 and may communicate with a server computer system 22 on network 20. The system of the present invention may also include one or more clients 19 that only allow the user to view information, and not enter or store information. In a preferred embodiment, one or more clients are physically located at work sites so that users can directly input information about a work site at the work site. Other clients may be located in areas that are quickly accessible work site managers, such as a managers office. For example, client 10 might be physically located along an assembly line, while client 18 might be located in the office of the manager responsible for overseeing the assembly line. In this way, problems with the assembly line can be quickly brought to the attention of employees responsible for overseeing the status of a work site. While FIG. 1 shows only five clients 10-18, any number of clients may be used depending upon the facility the present invention is implanted in. The clients 10-18 can be any type of client such as but not limited to a personal computer, a personal digital assistant, a web enabled appliance, or a web enabled cell phone. Server computer system 22 acts as a central computer system allowing access to local data source 16, such as databases or applications, residing on server computer system 22 or across network 20. The server 22 may include any type of server(s) configured as either a file server, a database server, or a combination thereof. The Network 20 may be any one of a number of conventional network systems, including a Local Area Network (LAN) or Wide Area Network (WAN), as is known in the art (e.g., using Ethernet IBM Token Ring, or the like). The Network 20 includes functionality for packaging client SQL calls and its parameters into a format (of one or more packets) suitable for transmission across a cable or wire, for delivery to the server 22. In an alternate embodiment, a wireless network may be implemented to practice the present invention.

Preferably, the network 20 is configured as an Ethernet because of the pervasive nature of Ethernet availability as a corporate networking architecture. Further, using Ethernet cabling as a backbone allows maximum flexibility for the novel system inasmuch as Ethernet cabling provides a number of significant advantages over existing alternative serial wiring implementations. In particular, Ethernet cabling allows the client system 10-18 to be disposed at an effectively unlimited distance from other client systems and from a control source, such as a server application or a central database unit. In addition, data transmission between a server or central database unit and the client system 10-18 are functionally robust and highly reliable because of the error recovery mechanisms inherent in IP packet-based communications as used in Ethernet Networks.

As shown in FIG. 1, server computer system 22 may handle information requests from a multiple of client computer systems 10, 12, 14, 16, 18 connected to network 20. In addition, program applications executing on server computer system 22 may also act as "clients" to other network server computer systems (not shown) implementing database applications or other legacy systems creating a multi-tier client-server network configuration. The term "information request" refers generally to any information request or program application request that may be processed by a server computer system.

Figure 2:
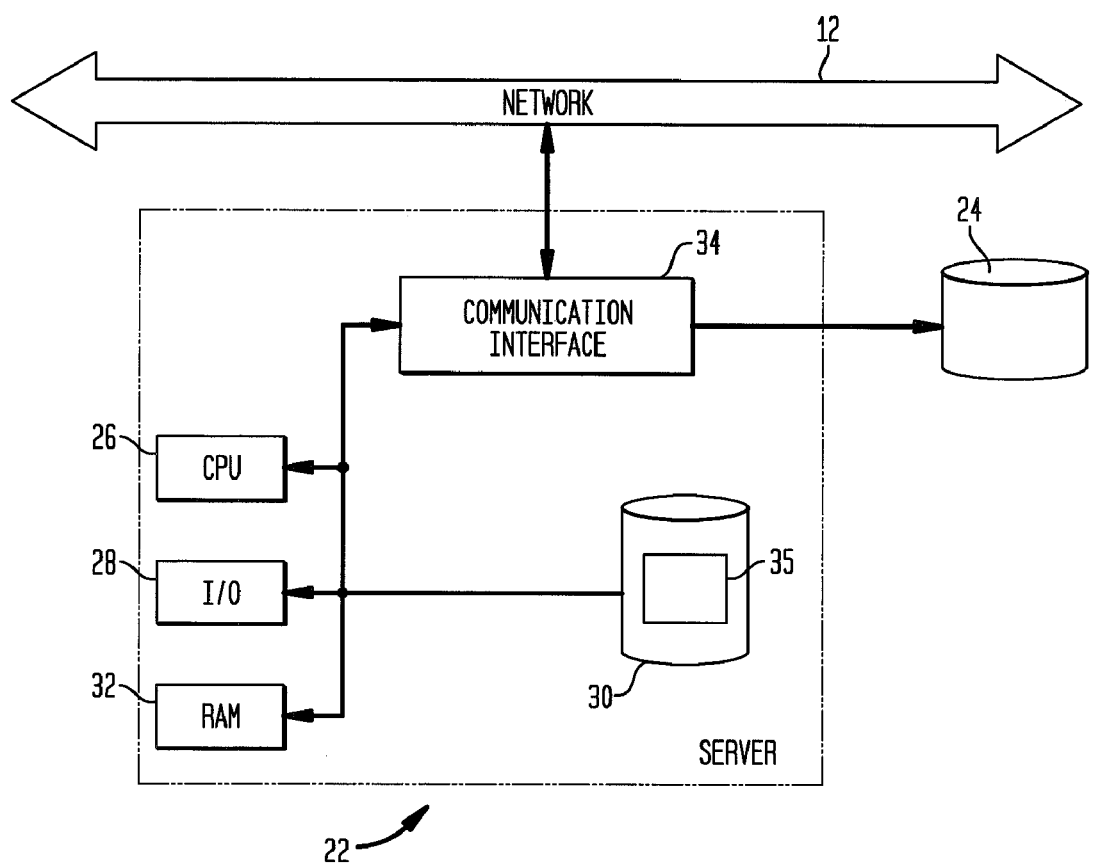
FIG. 2 represents a block diagram of a network system shown in FIG. 1 showing further detail about the server.

The hardware present in each of the computer systems shown in FIG. 1 may be of any conventional type such as is typically found on computers in a client-server network environment. As shown in FIG. 2, it is anticipated, however, that server computer system 22 will be equipped with some sort of central processing unit (CPU) 26 some sort of conventional input/output equipment 28 such as a keyboard and a video display monitor, some sort of conventional data storage device 30 such as a disk or tape drive or CD ROM drive, some sort of random access memory (RAM) 32 and some sort of conventional network communication hardware 34 such as an Ethernet interface unit for physically coupling the computer system to network 12. Network 12 may be implemented using any conventional network protocol such as TCP/IP, SNA, SMB, HTTP, FTP, IIOP, or DCOM.

In server computer system 22, a server software program 35 is stored on storage device 30 and installed on the server computer system 22. The server software program 35 is responsible for handling connections and information requests from the client computer system 10. The server software 35 may provide access to a variety of local data sources 24 present on server computer system 22. For example, the server software 35 may allow access to information databases, such as DB2, IMS, Oracle, and Sybase. Additionally, server software 35 may allow access to other network server computer systems running client-server or legacy systems.

Figure 3:
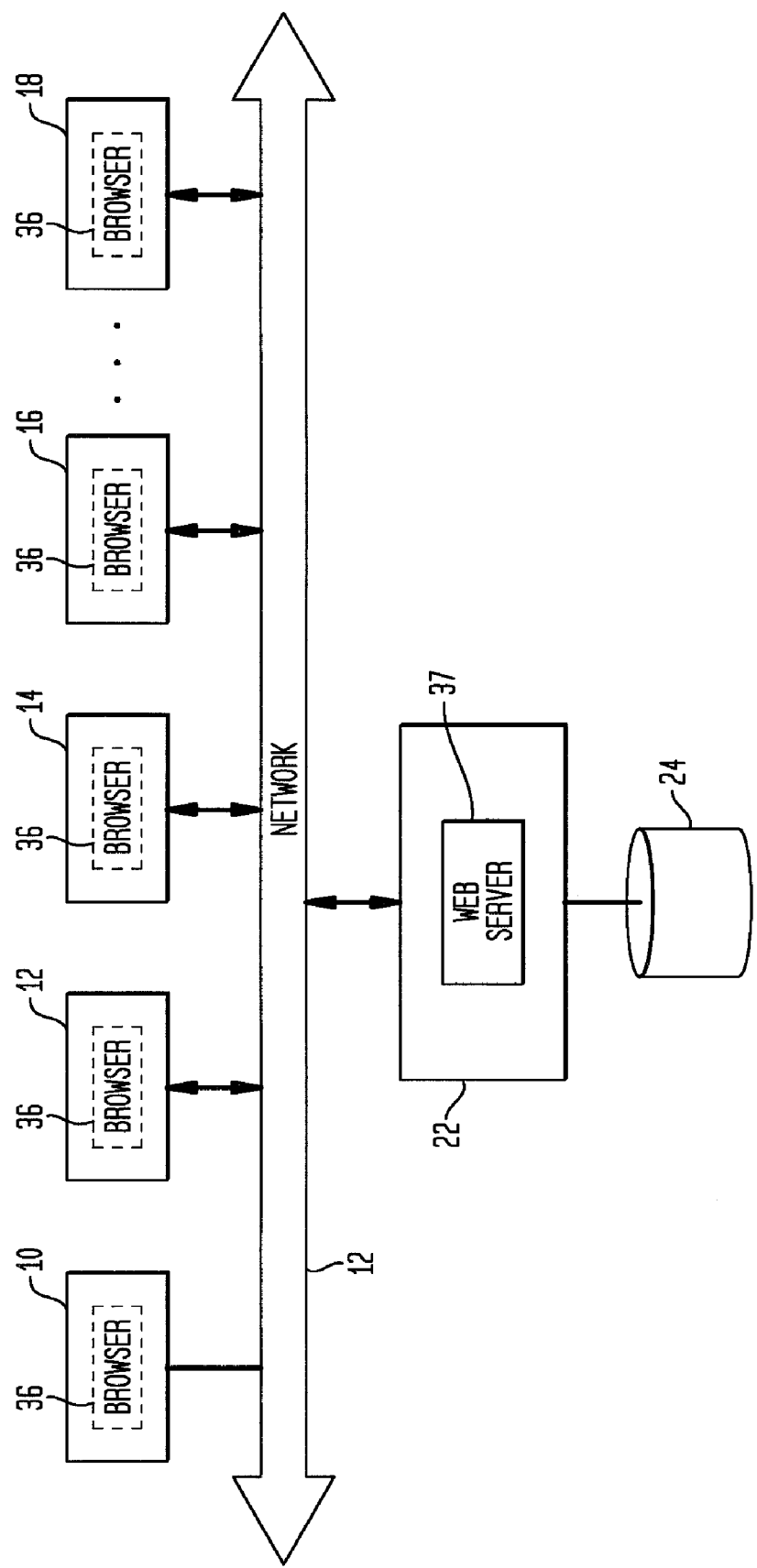
FIG. 3 represents a block diagram of the network system shown in FIG. 1 being implemented using the internet.

FIG. 3 is a basic network diagram illustrating the Internet or World Wide Web. In FIG. 3, one or more client computer systems 10, 12, 14, 16, 18 running web browser programs 36 are connected to the Internet and communicate with server computer system 22 running a web server program 37. A web browser 36 is a software program installed and running on a client computer system that enables the client computer system to communicate with server computer systems to access the local data source 24 residing on server computer system 22. Two common web browser software programs on the market today are Microsoft Corporation's "Internet Explorer" and Netscape Communications Corporation's "Navigator." A "web server" program is a software program installed and running on server computer system 22 that supports the HTTP information protocol. For example, Microsoft and Netscape produce web server programs to run on server computer systems interfacing with web browsers. The HTTP information protocol defines how the web browser client computer systems 10-18 (or "web browsers") send requests to the web server computer system 22 (or "web server") and how the web server program 37 replies to the requests. The details of the communication protocols and the operation of the Internet 12 or World Wide Web are well known to those skilled in the art. Similar to the computer network of FIG. 1, the web server 22 may allow web browser clients 10-18 access to data sources or applications present on web server 22 or to data sources or applications across the network 12.

Figure 4:
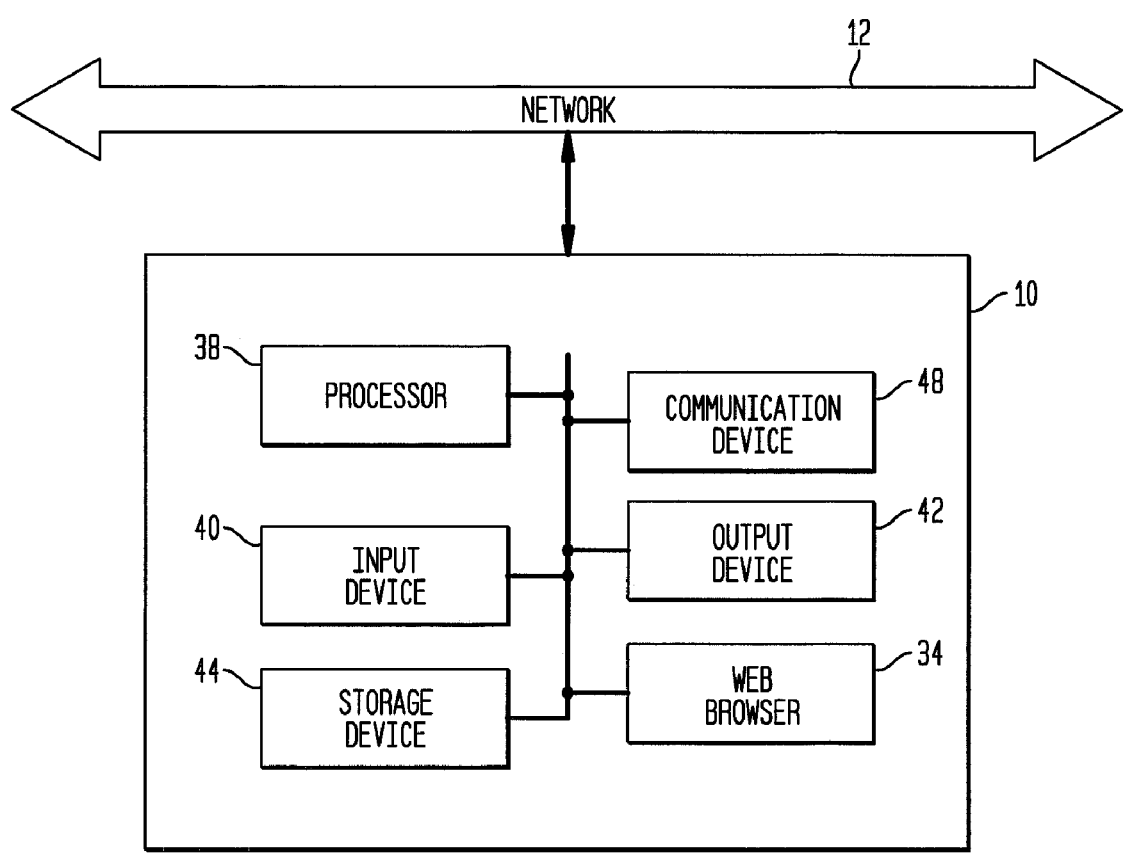
FIG. 4 represents a block diagram of the network system shown in FIG. 1 showing further detail about a client.

FIG. 4 is a block diagram depicting the internal structure of client computing device 10 in accordance with an exemplary embodiment of the present invention. Client computing device 10 may include a processor 38, input device 40, output device 42, storage device 44, Web browser 46, and communication device 48. Input device 40 may include a keyboard, mouse, touch pad, track ball, touch screen, voice-recognition device, or any other device that provides input from a user. Output device 42 may include a monitor, printer, disk drive, speakers, or any other device that provides tangible output to user. Storage device 44 may include volatile and nonvolatile data storage. Volatile data storage includes RAM, a cache, or any storage medium that temporarily holds data while being processed; nonvolatile data storage includes a hard drive, CD-ROM drive, tape drive, removable storage disk, or any other non-temporary storage medium. Communication device 48 may include a modem, network interface card, or any other device capable of transmitting and receiving signals over a network 12. Web browser 34 may be executed by processor 38 and may include Internet Explorer™ by Microsoft™ or Communicator™ by Netscape™, or any other software program that displays data from a Web server to a user via output device 42. One skilled in the art would appreciate that the components of client computing device 10 may also be connected wirelessly, possibly through an infrared connection.

Processing circuitry 38 may include any suitable processor, such an Intel Pentium microprocessor, and other suitable circuitry (e.g., input/output (I/O) circuitry, direct memory access (DMA) circuitry, etc. Communications device 48 may include, for example, a modem (e.g., any suitable analog or digital standard, cable, or cellular modem), network interface card (e.g., an Ethernet card, token ring card, etc.), wireless transceiver (e.g., an infrared, radio, or other suitable analog or digital transceiver), or other suitable communications device.

Figure 5:
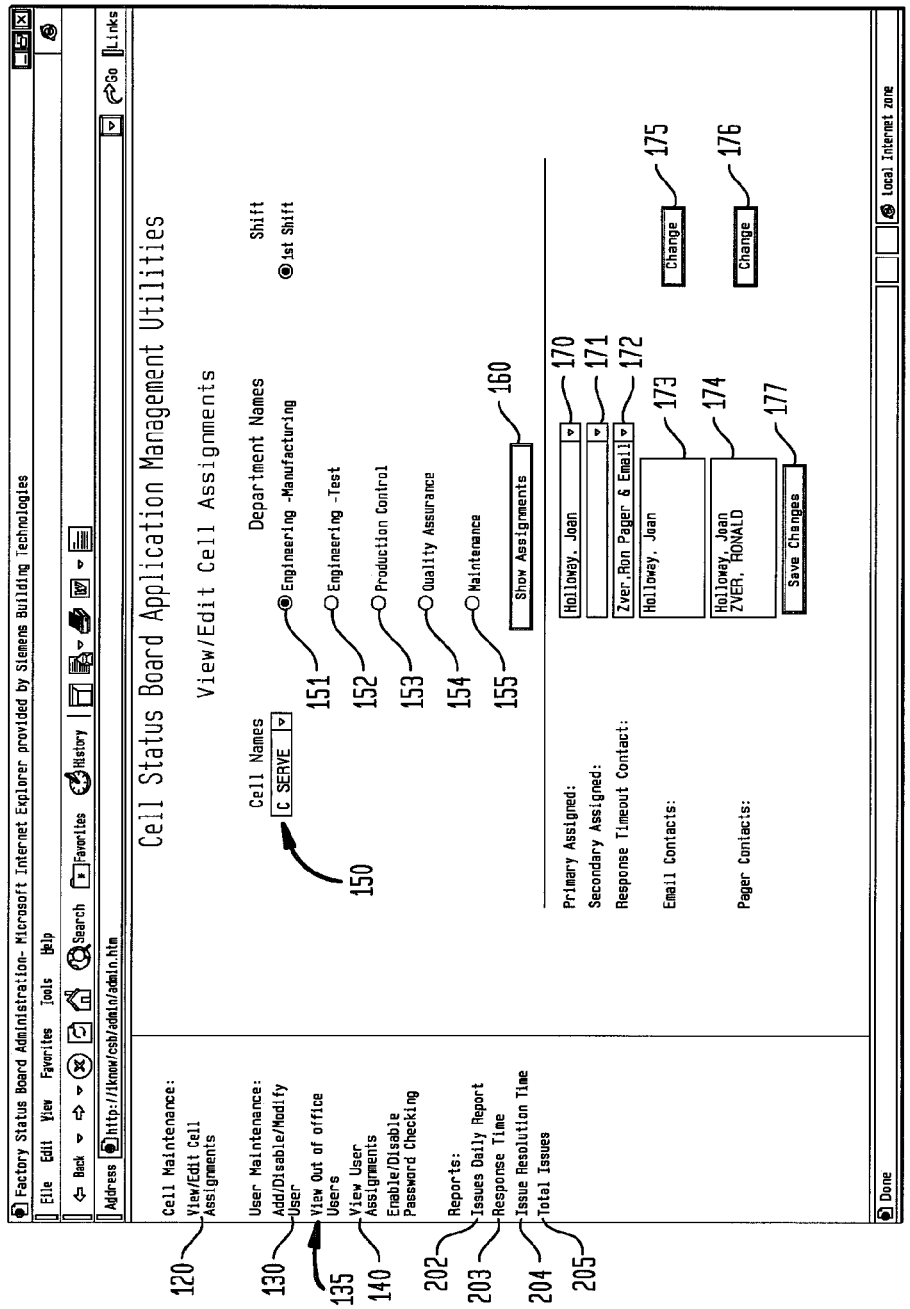
FIG. 5 illustrates a management entry screen allowing a manager to view or edit work cell assignments.

Using the present invention, a users such as, but not limited to, facility managers may use the present invention to pre-assign support people to be immediately notified to respond to a particular type of problem for a particular work site, assign an "out of the office" backup for any individual, and generate standard reports from database 24. FIG. 5 shows a management entry screen 100 allowing a manager to view and/or edit work cell assignments by selecting link 120. A manager may then select a cell or icon name using button 150. A manager may then select a department name by selecting one of buttons 151-155. A manager may then show assignments by selecting button 160. Data relating to assignments for a cell is then shown in boxes 170-174. Using buttons 175 and 176, a manager may change email contact assignments and pager contact assignments. A manager may then save any changes made to an assignment by selecting button 177. These changes are then stored in database 24.

Figure 6:
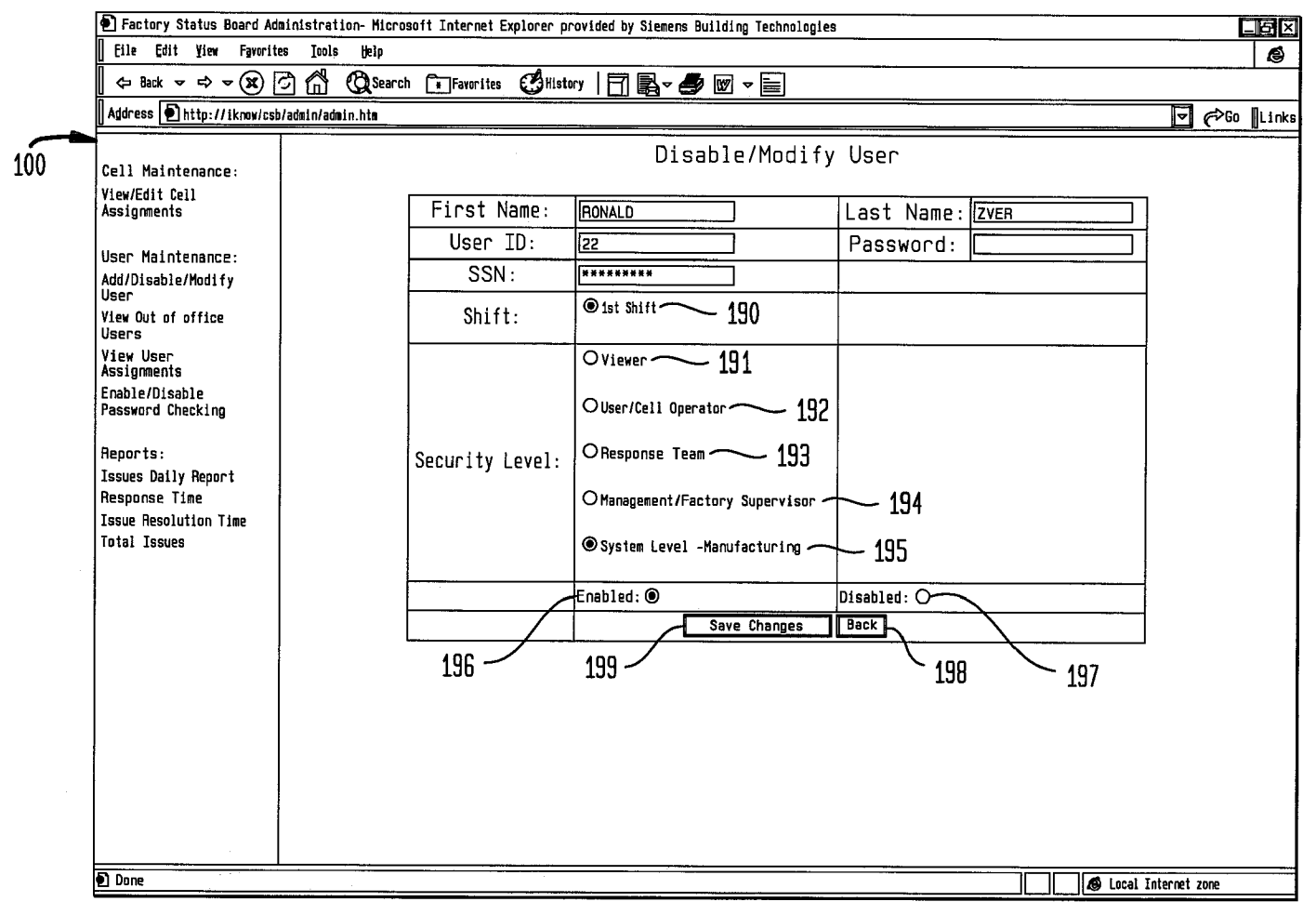

If a manager wishes to add or disable or modify a user, the manager may select link 130. The resulting display is shown in FIG. 6. Using the entry screen 100 shown in FIG. B, a manager may change information about a user's shift by selecting a button in area 190 and may then change a user's security level by selecting any of the buttons 191-195. A manager may also enable or disable a user by selecting buttons 196 or 197. A manager may move back by selecting button 198, and may save changes by selecting button 199.

Here again, any information entered by a manager using the present invention may be stored in database 24.

Figure 7:
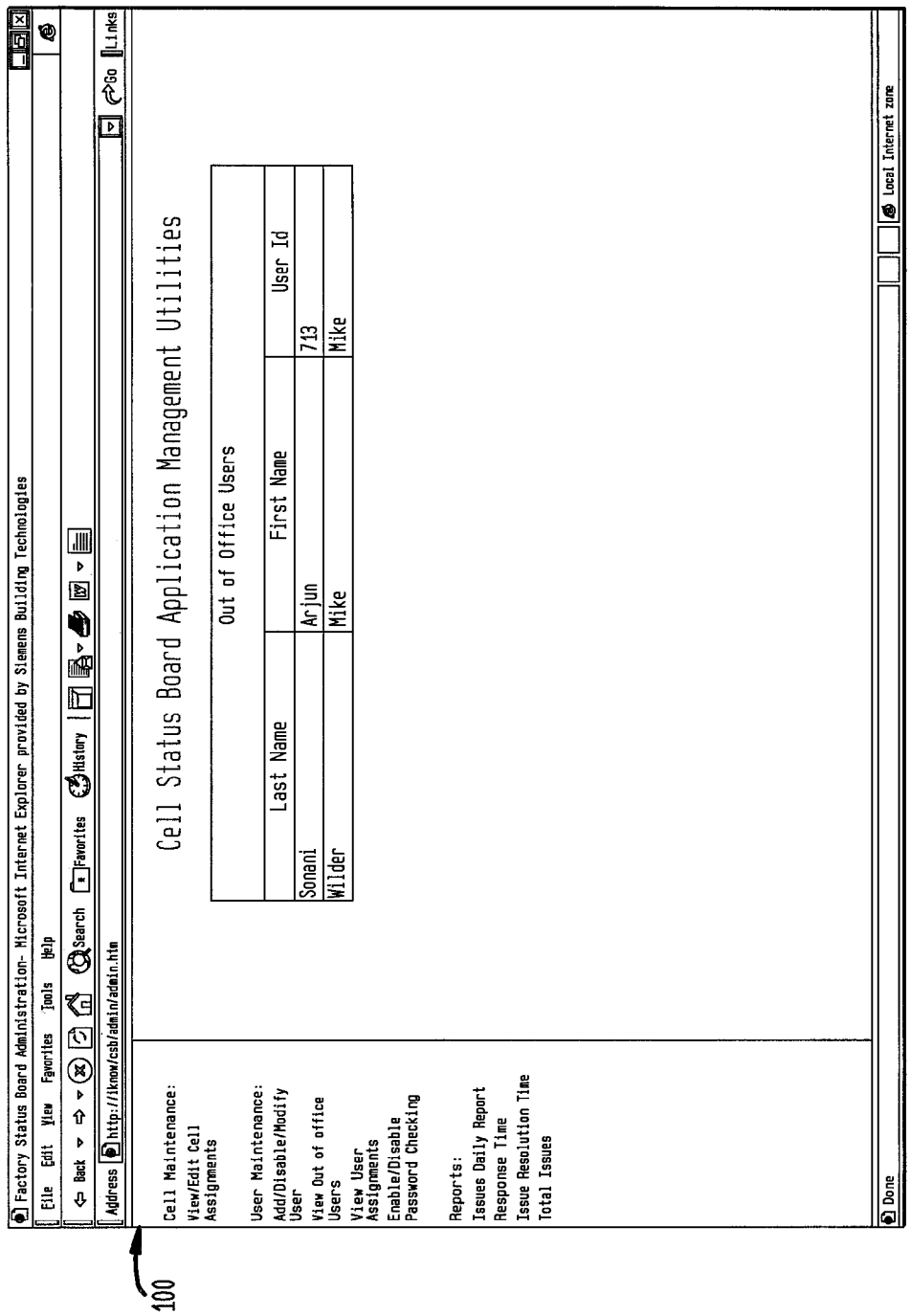
FIG. 7 illustrates a management entry screen allowing a manager to show current employees out of the office.

Referring again to FIG. 5, a manager may select link 135 to determine which users are out of the office, and unable to respond to a problem or be alerted to a problem. As shown in FIG. 7, the resulting entry screen 100 shows a list of users out of the office, and includes information about the users out of the office.

Figure 8:
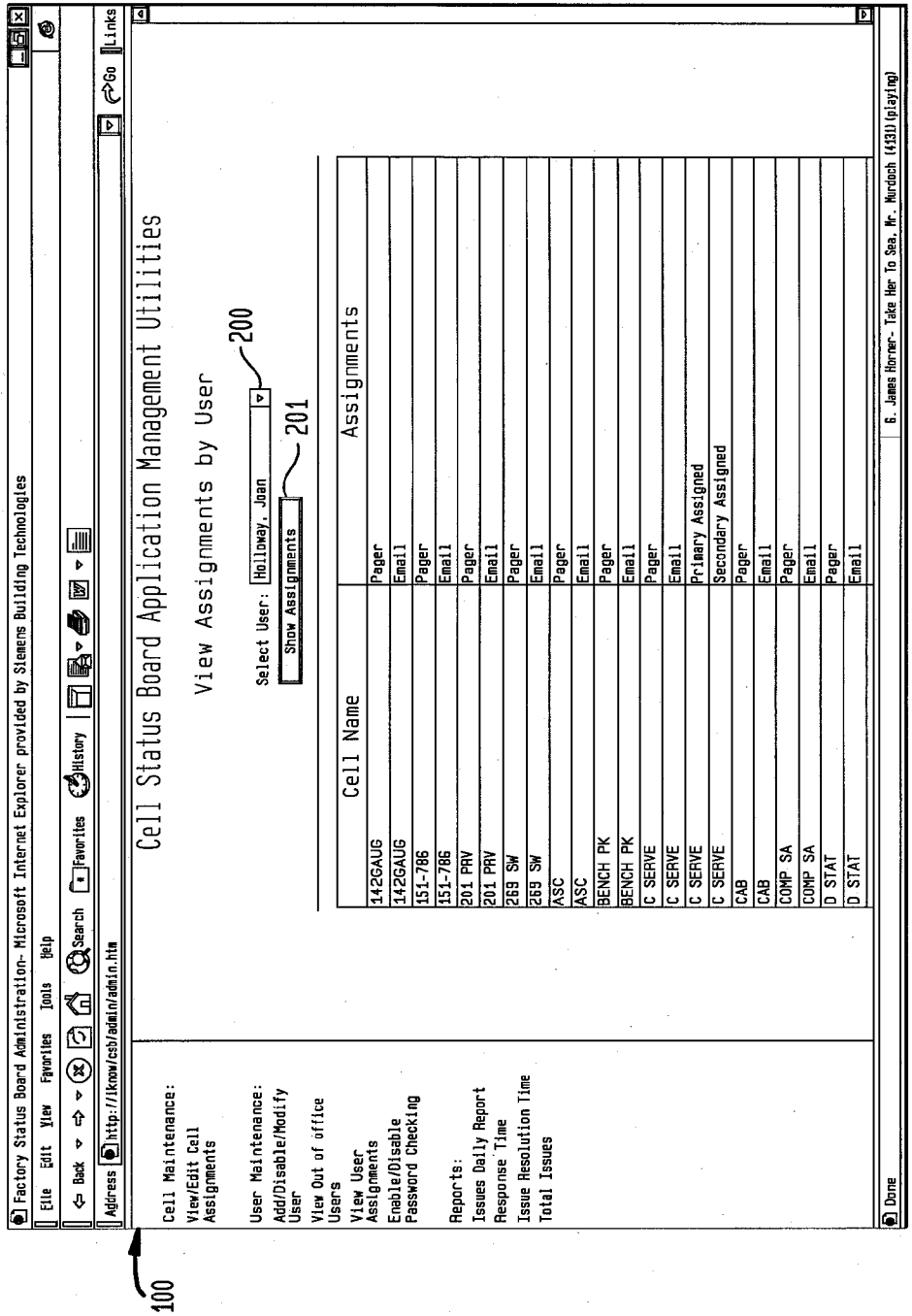
FIG. 8 illustrates a manager entry screen allowing a manager to view user assignments.

Referring again to FIG. 5, a manager may select link 140 to view user assignments. As shown in FIG. 8, the resulting display 100 allows a manager to select a user using button 200, and then show assignments for a user by selecting button 201. The resulting display 100 will show all the work cells associated with the user and the mode of notification they will receive.

In still another embodiment, the present invention may be used to generate reports. Custom reports are available simply by taking the SQL files and using many common programs to extract data such as MS Access or MS Excel. Types of data that may be maintained by the system automatically include total open issues, total conditional issues, new issues created during the day, and issues closed during the day. For a particular issue, the elapsed time between the time entered and the first response record opening and the time entered and the time the sequence is closed may be stored for future review. Report possibilities include monthly reports showing accumulation of all saved data described above and yearly report showing all accumulated monthly data. Accordingly, the present invention provides a manufacturing system manager with the ability to extract information about the historic performance of any work site.

Figure 10:
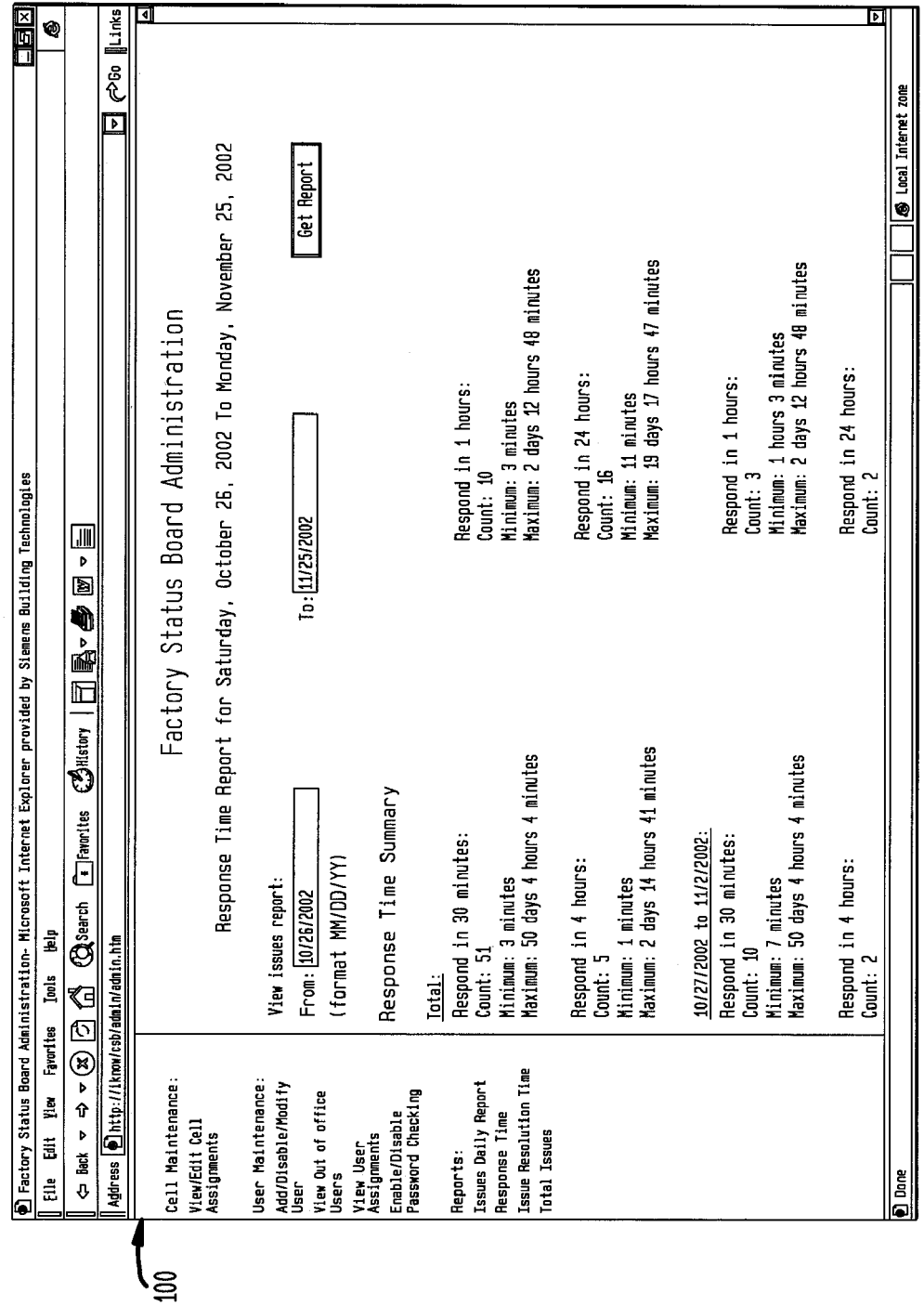
FIG. 10 illustrates a report screen comprised of response times for open issues.
Figure 11:
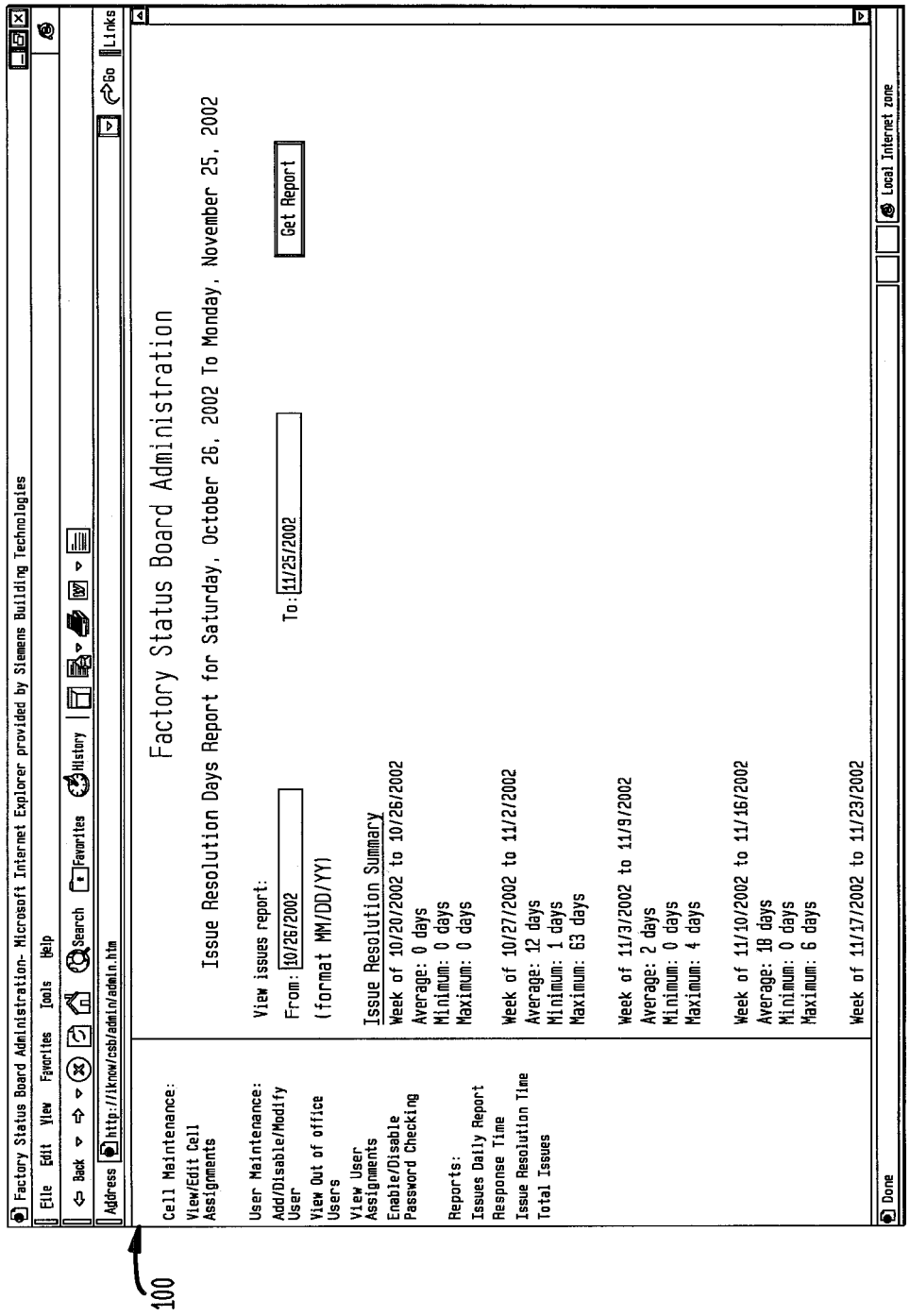
FIG. 11 illustrates a report screen for issue resolution.
Figure 12:
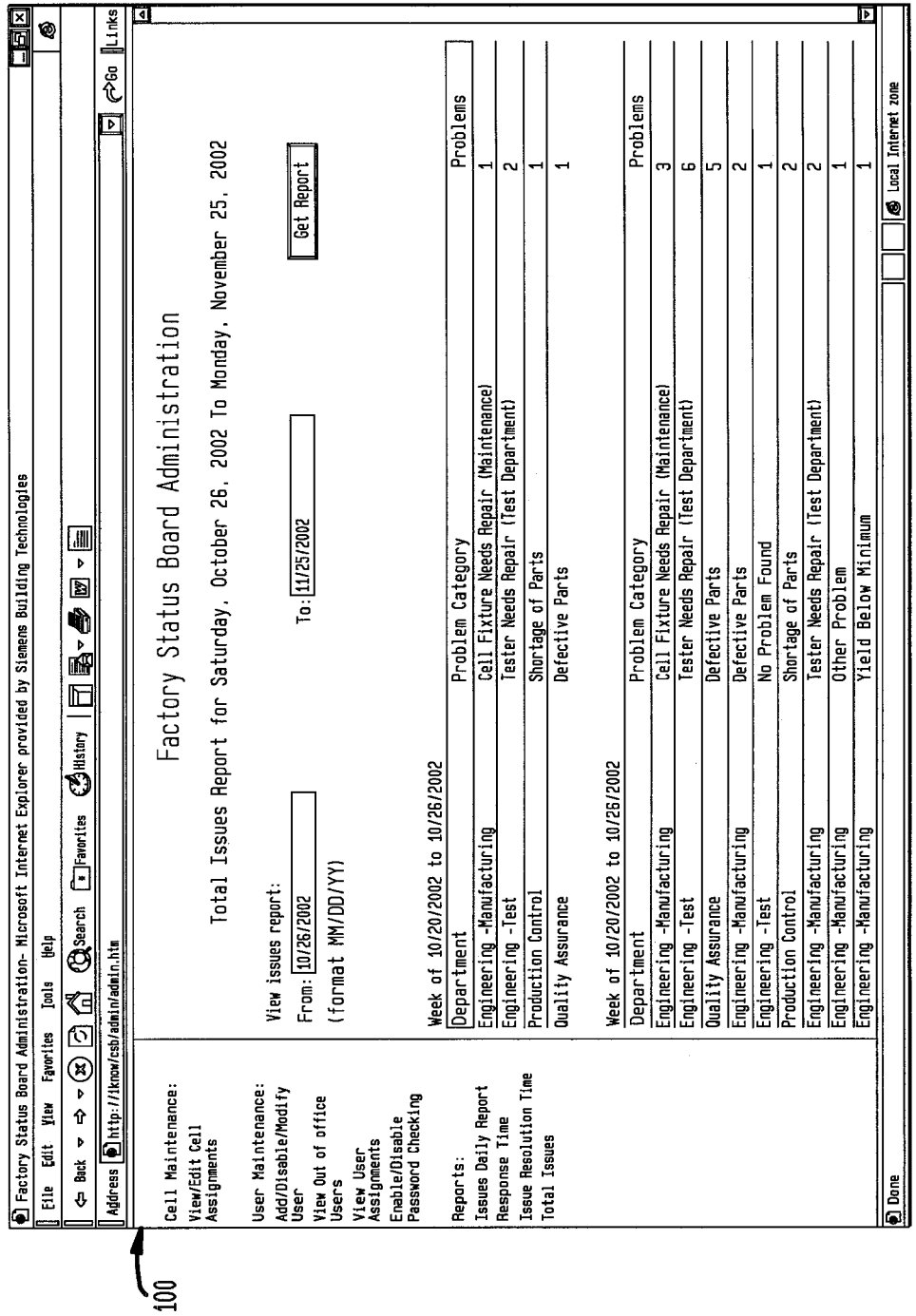
FIG. 12 illustrates a report screen for open issues for a department.

Referring yet again to FIG. 5, a manager may choose to select different reports to generate by selecting any of links 202-205. By selecting link 202, a user may generate an issues daily report, which in includes information for a particular date such as the number of new issues opened, the number of open yellow and red issues, and the number of closed issues, as shown for example in FIG. 9. By selecting link 203, a manager can generate a report illustrating the response times for issues, as shown in FIG. 10. By selecting link 204, a manager can generate a report illustrating how long it took for one or more issues to be resolved, as shown in FIG. 11. Finally, by selecting link 205, a manager can generate a report allowing the user to view how many issues a particular department has open during a given time period, as shown in FIG. 12.

In a preferred embodiment of the present invention, an application comprising a user interface for entering and displaying information about one or more work sites in a physical location such as a factory will be stored in local data source 16 NUMBER?. The user interface of the present invention will now be described with reference to FIGS. 13-21. Interface 300 shown in FIG. 5 is the common entry point for most users to enter problems or seek status for entered issues. Access is started by selecting the problem area icon 310. For here the user can select where to proceed to enter or view data. Each icon 310 provides a common entry point for all users but can provide different functional uses of the information. The interface 300 will have primarily icons 310 to indicate a work cell, but also this interface 300 will have icons 110 to represent "Other" factory areas which are not cells. Both icon types should be similar and share similar functions.

Figure 13:
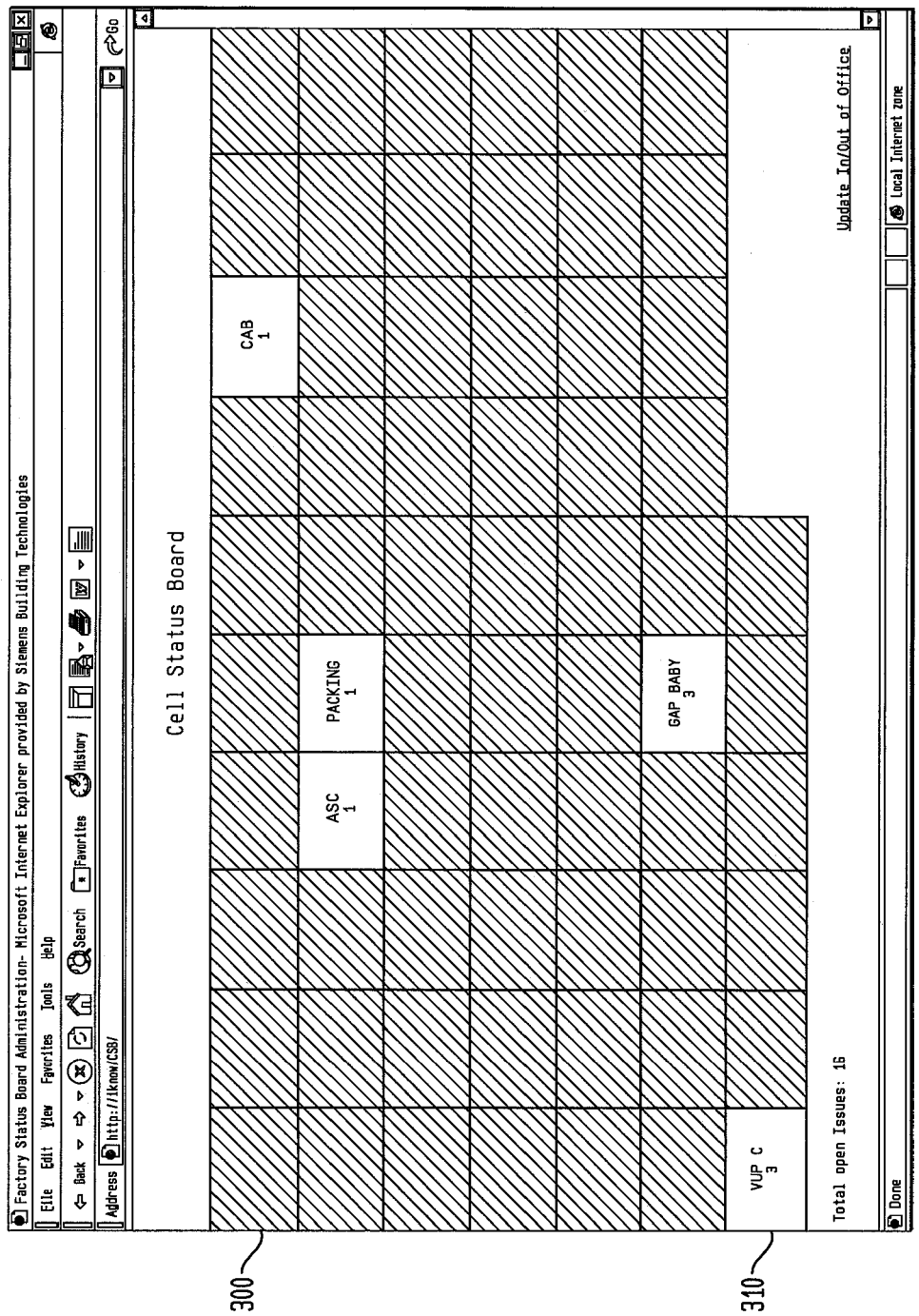
FIG. 13 illustrates a user interface of the present invention where each icon represents a common entry point for entering or viewing information about a work site.

As shown in FIG. 13, user interface 300 displayed on output device 42 of a client 10-18 includes a plurality of icons 310 arranged in a grid-like pattern, wherein each icon 310 represents a work site. An example of a work site might be of one section of an assembly line. The appearance of each icon 310 reflects the status of the corresponding work site. Within each icon, the name of the work site and the number of open issues for the work site are displayed. In a preferred embodiment, the icon names can be changed dynamically in a text file with the new cell name being displayed without the need to recompile code. The total number of issues active in the entire work environment, such as a factory, may also be displayed on the interface 300. In the present invention, an automatic status update is provided whenever a new issue is entered. The present invention also has a feature that allows users to identify whether they are in or out of the office, allowing facility managers to track whether key employees are at their designated work site.

Each icon 310 is color coded to designate whether or not there is a risk of a task being performed late, such as a product being delivered late to a customer. When an icon 310 is color coded green, this is an indication that the task is scheduled to be performed on time. When an icon 310 is color coded yellow, this indicates a risk potential of a task not being performed on time. When an icon 310 is color coded red, this indicates that the task will not be performed according to schedule. The number of open issues for a work site are displayed on the corresponding icon 310. Each icon 310 is further assigned an icon name for easy identification. An advantage of the present invention is that icons may be added dynamically using configuration text data files.

Referring to FIG. 6, a user may use the interface 300 to notify other parties that a new issue exists for a work site by directly selecting the corresponding icon 310 using an input device 40 such as a mouse. Once the user has clicked on an icon 110, a form 320 will come up allowing the user to begin the processing of entering a new issue by selecting the add issue button 130 using the input device 40. Once the user has selected the add issue button 330, the user may be prompted to enter a user ID and password number.

Figure 15:
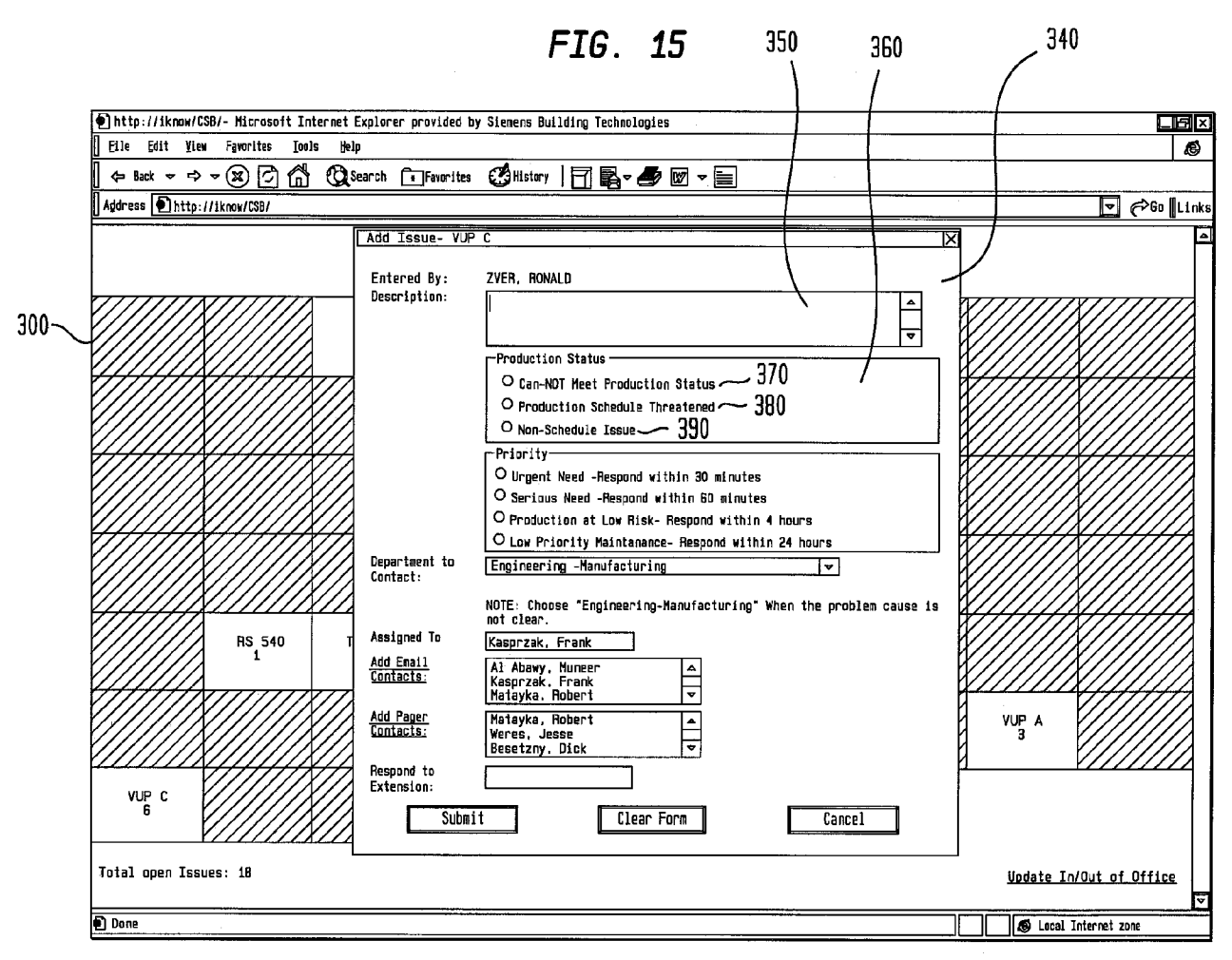

FIG. 15 illustrates one possible display including a form 340 a user may fill out in order to have a new issue added after the user has selected the add issue button 330. As shown in FIG. 15, in area 350, the user may be able to add a clear textual description of the issue using input device 40 so that others evaluating the issue can quickly evaluate the problem and respond accordingly. Within form 340, the user may also be prompted to indicate how the new issue will affect production status, as shown in area 360. The different options for production status may be displayed at area 360. The different options for production status will determine the color of the respective icon 310. If the Can NOT Meet Production Status item 370 is chosen, the icon 310 will turn red. If either the Production Schedule Threatened item 380 or Non-Schedule Issue item 390 is chosen, the icon 310 will turn yellow. If more than one issue is logged by a user, the icon 310 will display the color of the most critical issue.

As further shown in FIG. 15, the user entering a new issue may also select the response time in area 390 using input device 40. If the chosen time expires without a response, a second request for service may be issued. In one embodiment of the present invention, the icon 310 may be presented with a unique display in circumstances where a notification signal has been sent out. The icon 310 may be provided with still other unique displays if subsequent notification signals have been sent, but not responded to.

Figure 16:
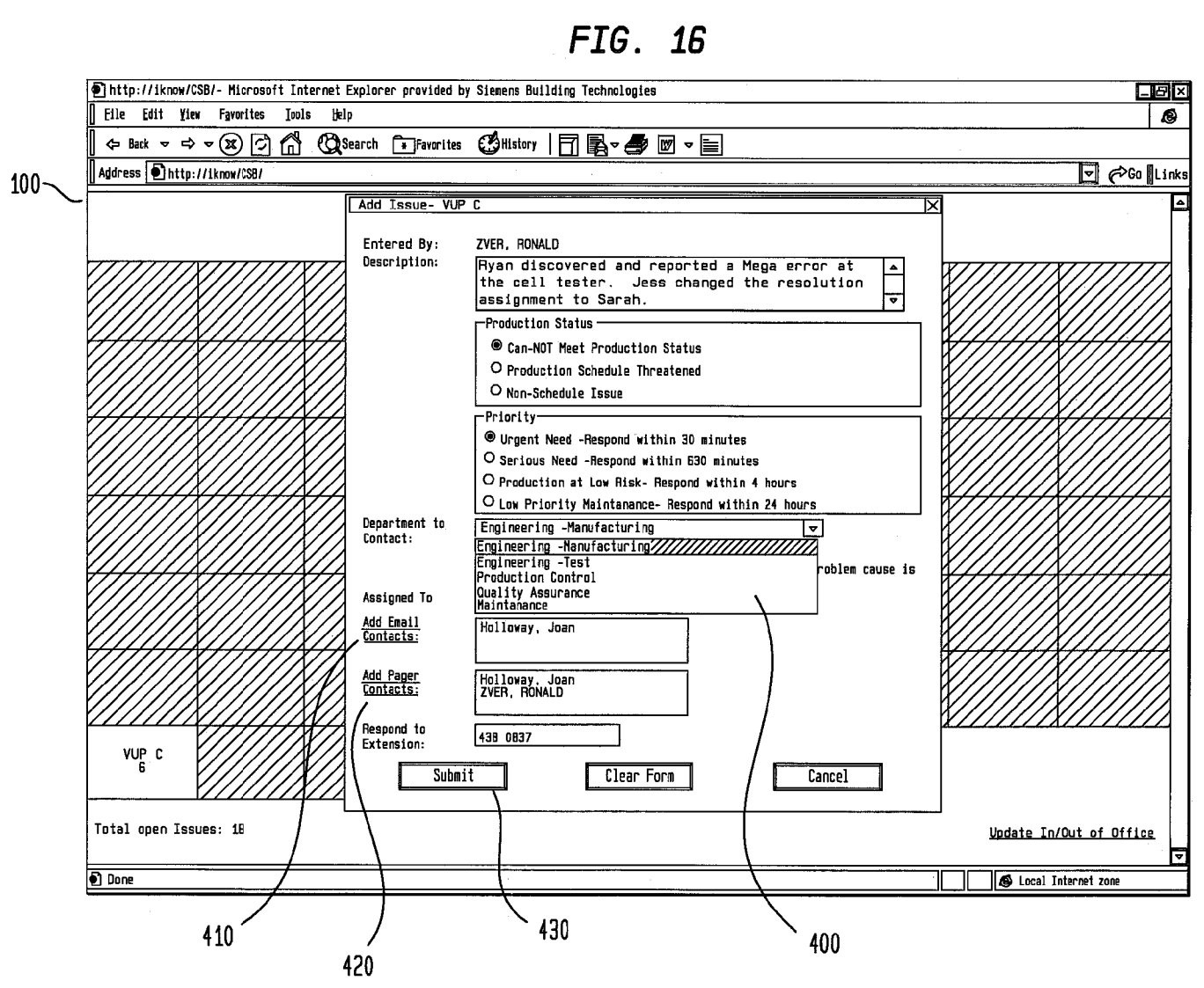
Figure 17:
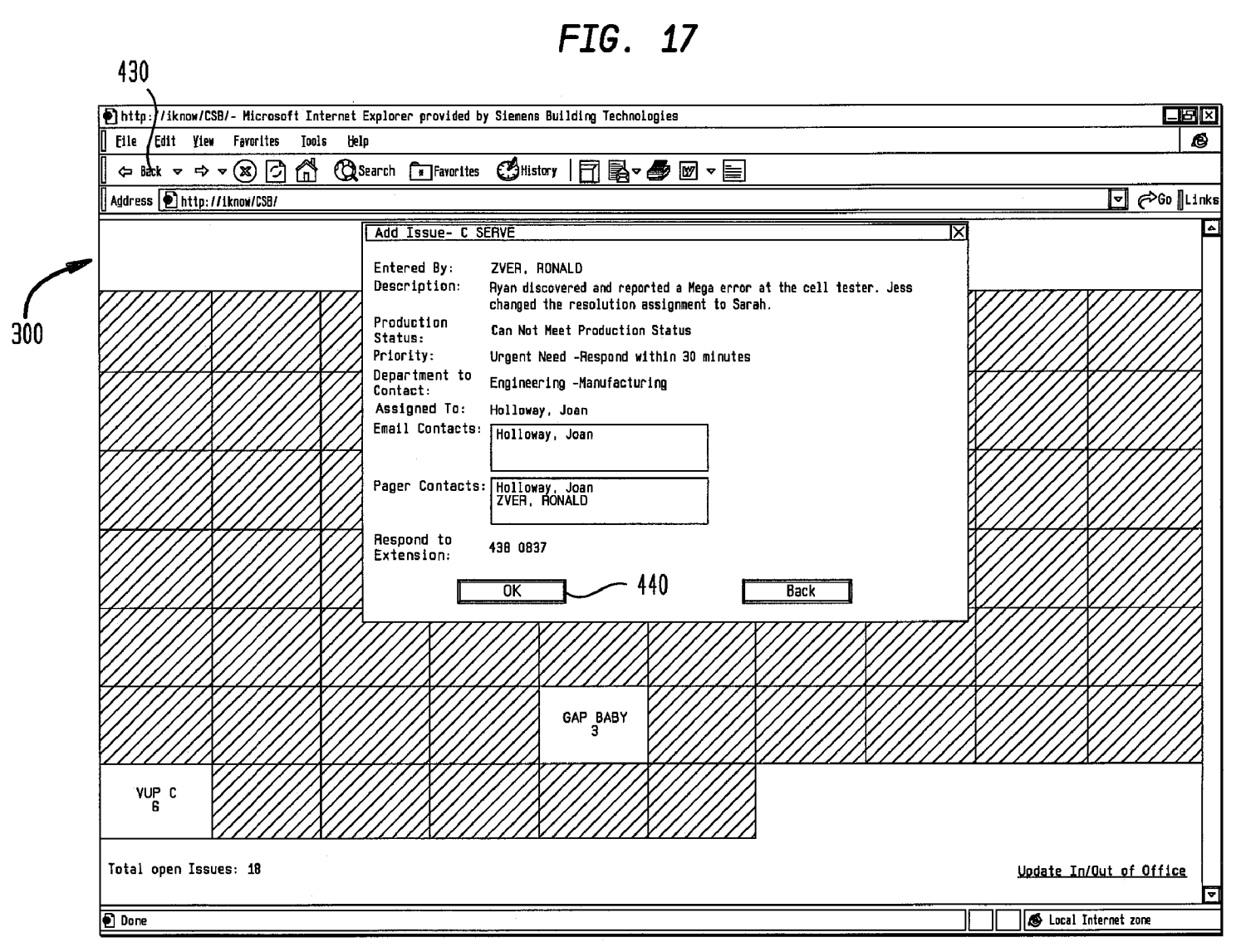

Turning now to FIG. 16, the user may next choose the department responsible for the issue from the list shown at 400. The system of the present invention will automatically assign an individual to the issue as well as notify those entered on the Email and pager lists. After selecting the employees to notify, the system will send a standard format message with the problem description included. As shown in FIG. 16, to add Email Contacts or Pager contacts in addition to predefined contacts, the user may click on the blue underlined text which reads "Add Email Contacts" 410 and "Add Pager Contacts" 420. The resulting display is shown in FIG. 17. If desired, the user may add a phone number or extension for the assigned person to contact. This information may be included in both the Email and pager message. Once the form is complete, the user may click on the submit button 430 shown in FIG. 16. Once a user has submitted an issue, a confirmation form, such as shown in FIG. 17, is displayed. A user may make any changes to the form before submitting the issue by clicking on the back button 430. The user may post the issue by clicking on the OK button 440.

Referring to FIG. 13, a user may review the detail of a posted issue for a work site by selecting the icon 310 that corresponds to the work site. As shown in FIG. 14, once a user has clicked on an issue, a display 320 is provided that provides a list of open issues for a work site. The user may then select a particular link 450 to obtain further information about the issue that corresponds to the link. Next, as shown in FIG. 10, after the user has selected an issue by selecting a link 250, the user may select an issue 260 or a response 270 to see its details. The resulting display is shown in FIG. 11.

Figure 18:
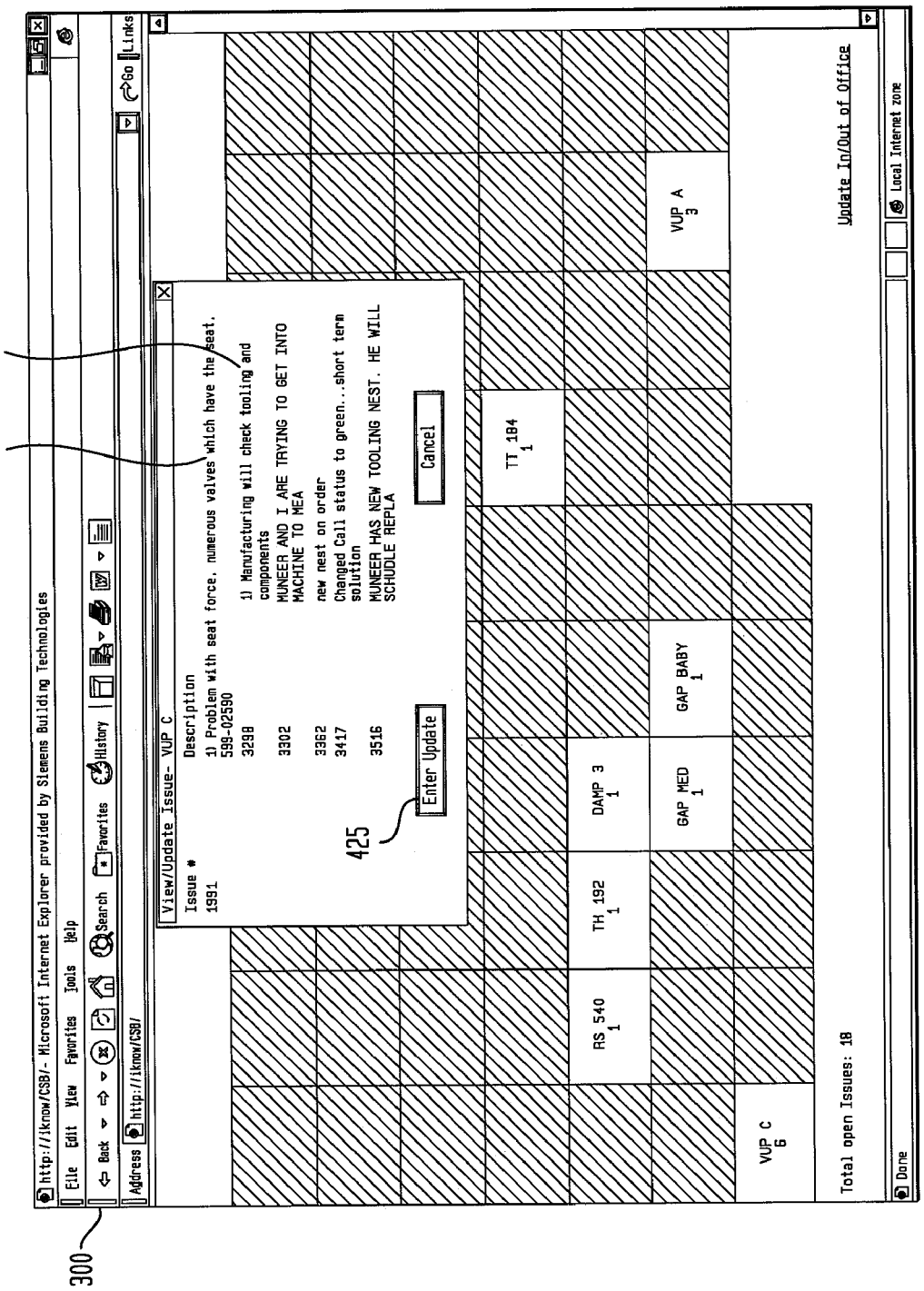
FIG. 18 illustrates how a user may view information about an issue at a work site or add an entry about the work site using the user interface of the present invention.
Figure 19:
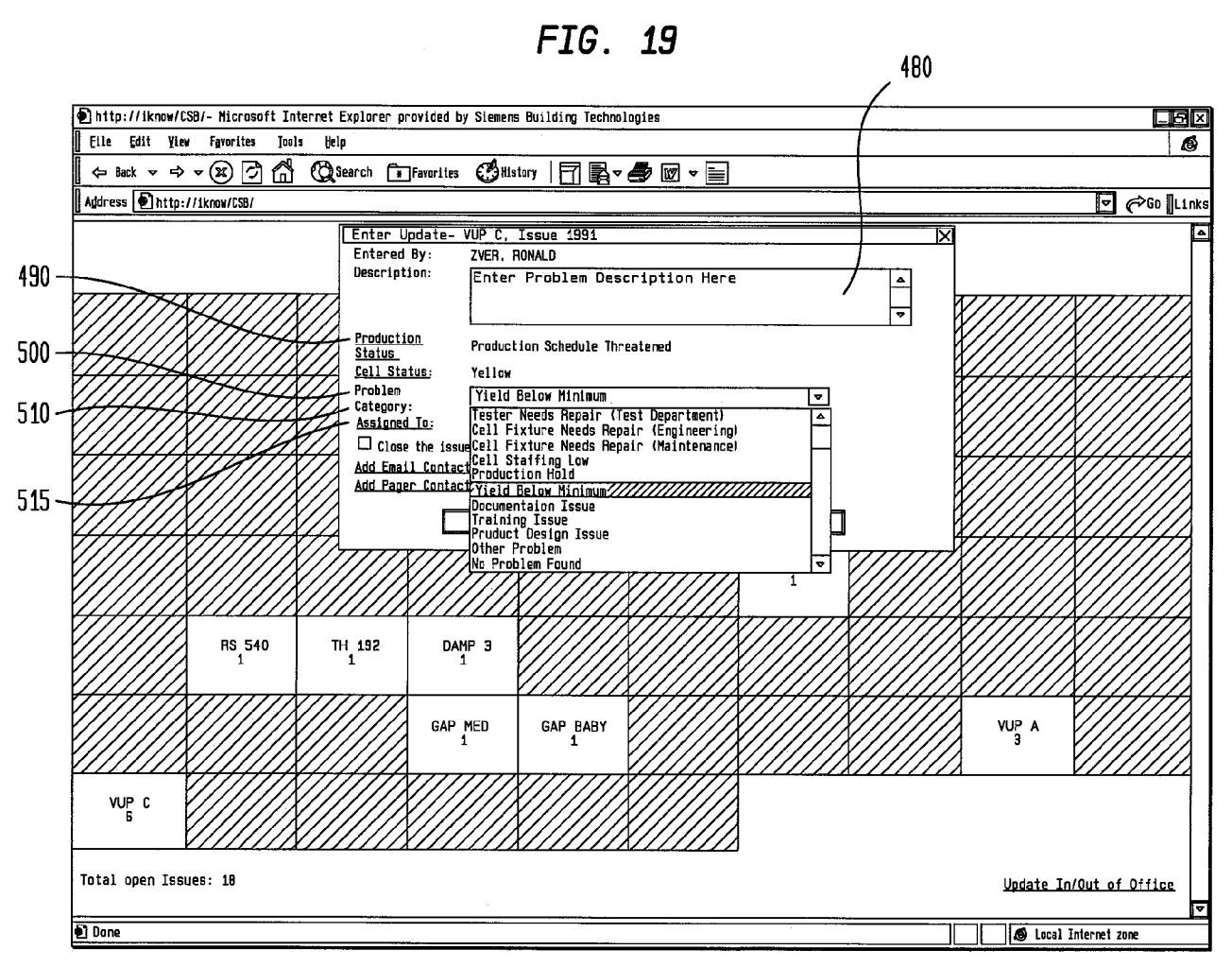
Figure 20:
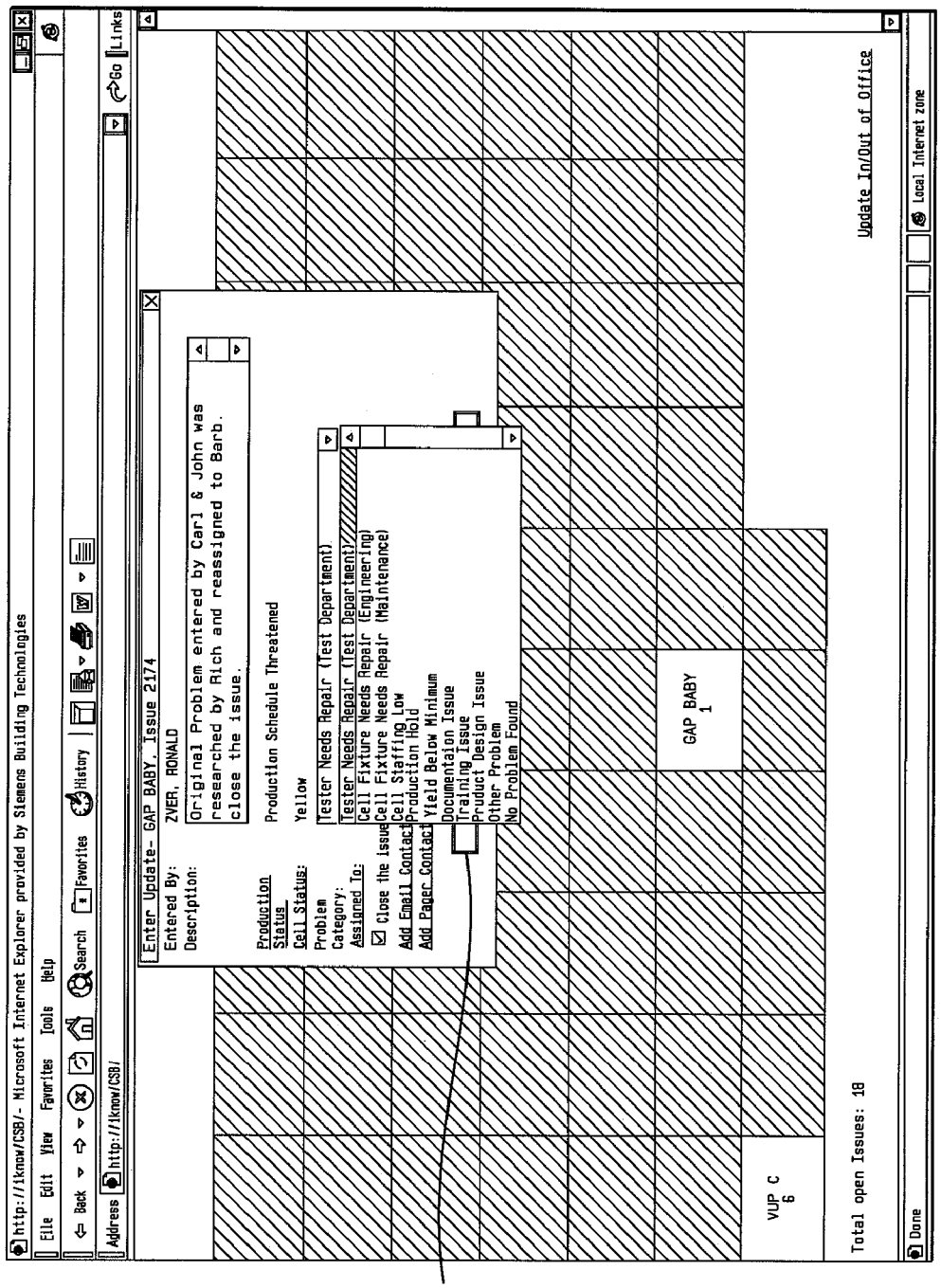
FIG. 20 illustrates how a user may close out an issue using the user interface of the present invention.
Figure 21:
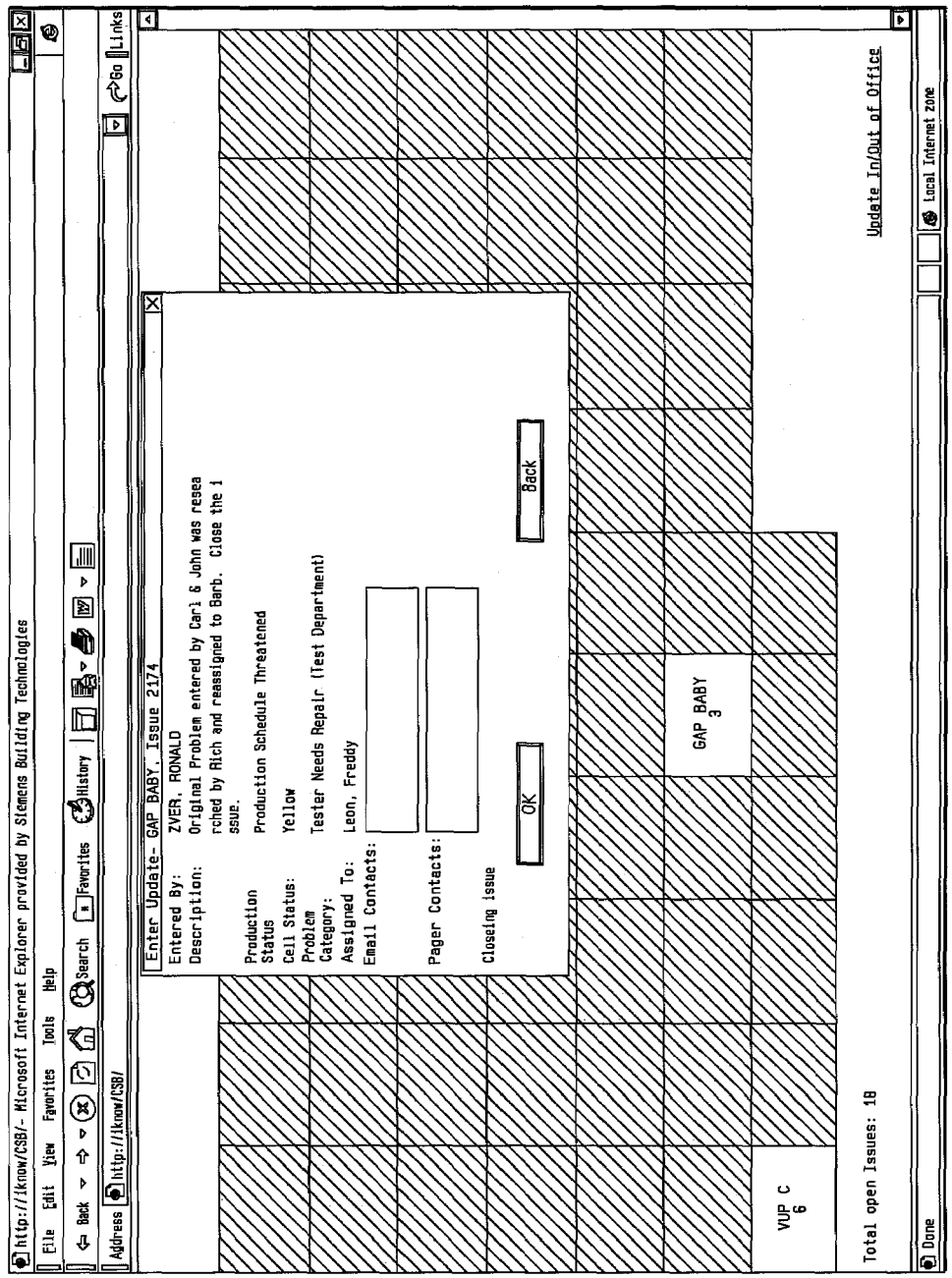
FIG. 21 illustrates a confirmation screen allowing a user to close out an issue using the user interface of the present invention.

As further shown in FIG. 18, the user is also presented with the option of updating a selected issue by selecting an issue, and then selecting the Enter Update button 475 on the interface 300. After the user has clicked on the Enter Update button 475, the system may ask the user to enter their User ID and/or password. The system will then display the image shown in FIG. 19. In the comment field 480, the user may enter a description needed for the update. As shown in FIG. 19, the user may make several modifications to an issue. The user may click on the production status link 490 to change the production status previously sent. The user may select the cell status link 500 to change the color of the icon 310. As shown at 510, the user may also change the problem category from the displayed list. The user may also assign an individual to respond to an issue using the Assigned To link 515. It is anticipated in the present invention that most issues will have more than one update. For the last update, as shown in FIG. 20, the user may select to close an issue to remove the issue from the display. The user may then submit the update by selecting button 520. If a user has selected to close an issue, a confirmation request will appear, as shown in FIG. 21. Once the user selects to close the issue, the issue being closed is removed from the display and can no longer be viewed.

Figure 22:
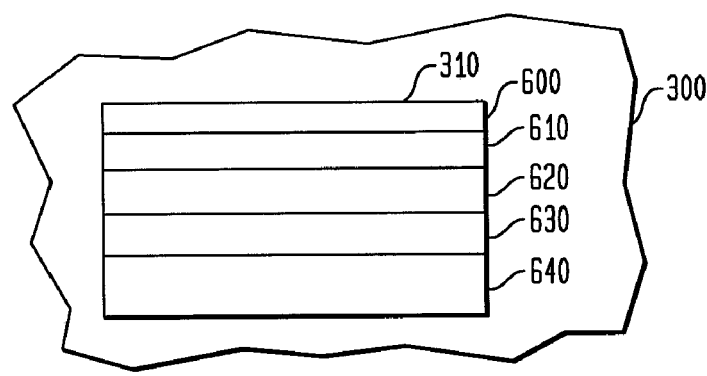
FIG. 22 illustrates an icon of the user interface of the present invention divided into several segments, each segment capable of displaying the status of one aspect of a work location.

In another embodiment, as shown in FIG. 22, each icon 310 may be divided into a plurality of segments 600, 610, 620, 630 and 640, each segment representing a location or individual at a work site. For example, one segment 400 can represent the status of inventory at a work site; segments 610 and 620 may represent the status of equipment at a work site, while segments 630 and 640 can represent the status of key personnel at the work site. In one embodiment, the segments 600-640 may be merely displays within icon 310. A user would be unable to directly drill down to obtain information relating to the segment, but would select an icon 310, and then select a link relating to an issue at a particular segment, in a similar fashion as shown in FIGS. 13 and 14.

Figure 23:
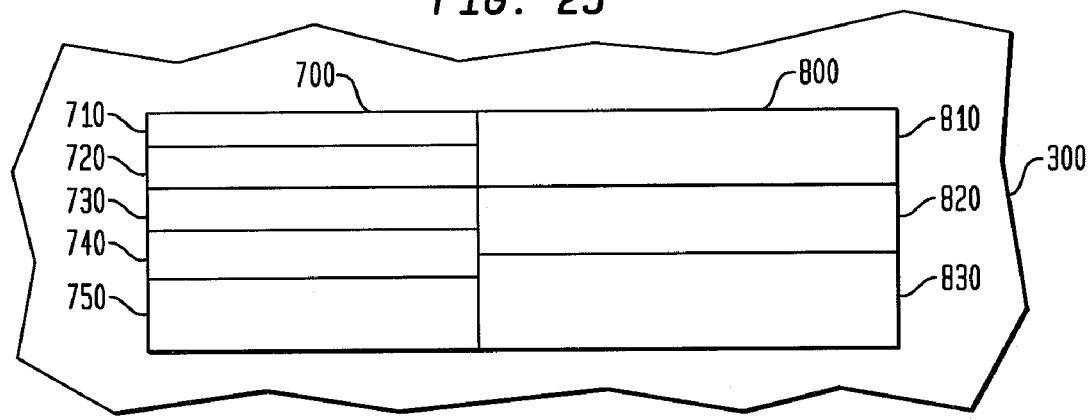
FIG. 23 illustrates display sections to be displayed in the user interface of the present invention wherein each display section represents a work site, and is comprised of a plurality of icons, each icon representing an aspect of a work site.

In an alternative embodiment, a group of icons, each representing a location in a work site, can be grouped together, so that a user can use an icon representing a location to directly drill down using the icon to obtain further information about the location. Referring to FIG. 23, interface 300 may be comprised of a plurality of display areas, such as display areas 700 and 800. Display areas 700 and 800 each may represent a work site, while icons 710, 720, 730, 740 and 750 and icons 810, 820 and 830 may represent the status of aspects of a work site, such as employee status, inventory status or equipment status within a work site, or the overall status of the work site. In this way, a user of the interface 100 of the present invention may be able to more quickly obtain information about a particular aspect of a work site.

Figure 24:
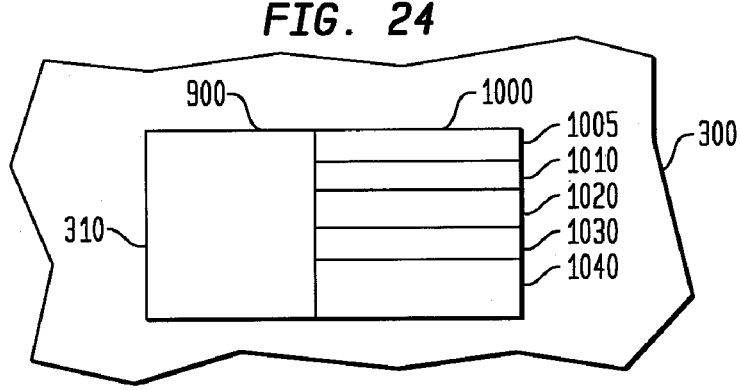
FIG. 24 illustrates an icon of the user interface divided into several segments, one segment representing the overall status of a work site, and the other segments representing aspects of the work site.

In yet another embodiment, as shown in FIG. 24, an icon 310 representing a work site may be divided into two sections 900 and 1000. The first section 900 may represent the overall status of the work site. The second section 1000 may be comprised of a plurality of segments 1005, 1010, 1015, 1020 and 1025, each segment representing the status of aspects of a work site, as discussed with respect to FIG. 23.

Figure 25:
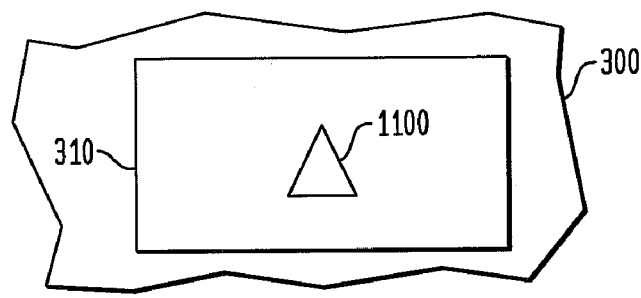
FIG. 25 illustrates a polygonal shape being displayed in an icon of the user interface of the present invention indicating the status of a work site.

Referring to FIG. 25, the appearance of an icon 310 can be changed to include one or more objects 1100 within the icon 310 to indicate the status of a work site. For example, a polygonal shape such as a triangle can be displayed in the icon to reflect the change in status of a work site, or to indicate whether or not a notification signal has been transmitted or responded to. The object may also be used to reflect the status of a location within the work site. The appearance of the object may also be changed to reflect a change in status of a work site, a notification, or a response to a notification.

Figure 26:
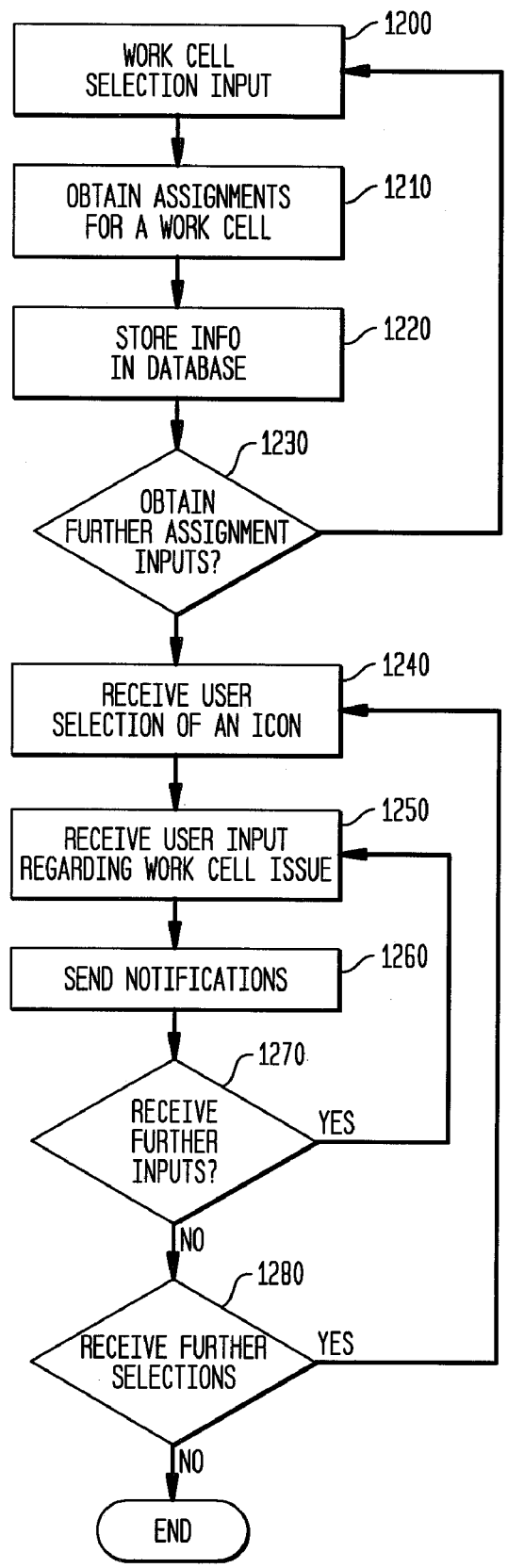
FIG. 26 is a block diagram depicting an exemplary method incorporating the principles of the present invention.

An exemplary method for providing a unique interface allowing an individual at a location, such as a work site to drill down into the system to quickly notify one or more individuals about one or more problems at the work site is shown in FIG. 26. An individual, such as a work site or factory manager may use the present invention to select a work cell (block 1200), and then assign a department or one or more individuals to respond to a particular type of problem that may occur at the work cell (block 1210). The manager may be presented with several types of potential problems at a work site, and may select a department or an individual or individuals to respond to each type of potential problem. This information is then stored in a database (block 1220). The manager may then select another work cell to assign individuals or departments to respond to any number of potential problems (block 1230).

Once assignments have been made to respond to potential problems at one or more work sites, the interface of the present invention may be conveniently used by workers at a work site where a client is located to directly select an icon representing the work site in order to notify others that a problem is occurring at the work site (block 1240). After the user has selected an icon, the user can then identify the problem (block 1250). Based upon the assignments made in block 1210, a department or one or more individuals are immediately notified by the system of the present invention about the problem (block 1260). The user may then identify further problems so that additional notifications may be sent (block 1270). The user then has the option of selecting another icon representing another work site to continue the problem notification process (block 1280).

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A computer implemented method for facilitating the exchange of information between users in a networked computer environment, comprising:

displaying a user interface on a display device, said user interface comprised of one or more icons, each said icon representing a physical locality comprised of a plurality of physical areas, wherein each icon is divided into a plurality of display areas, wherein each display area represents one of said physical areas; said icons displayed with a predetermined appearance depending upon the status of a physical locality such that the icons flash at a predetermined rate depending upon the status of the physical location;

receiving one or more user inputs directly using said one or more icons to add information within one or more of said icons about the status of one or more locations, wherein said one or more user inputs are received from one or more clients located at said one or more locations;

storing said user inputs in a memory; and directly selecting one or more icons to display information about one or more physical locations.

2. The method according to claim 1, further comprising receiving one or more user inputs directly using one or more icons to respond to said one or more user inputs to add information about the status of one or more locations.

3. The method according to claim 1, further comprising displaying one or more links to display information about the location after an icon has been selected.

4. The method according to claim 3, wherein the step of displaying one or more links to display information about the location further comprises displaying links to responses to user inputs adding information about the status of one or more locations.

5. The method according to claim 1, further comprising displaying information on at least one of said one or more icons about said one or more locations.

6. The method according to claim 1, further comprising displaying a plurality of objects within said one or more icons to indicate the status of the physical location.

7. The method according to claim 1, further comprising displaying the number of open events for a physical locality on said icon corresponding to the physical locality.

8. The method according to claim 1, wherein the user information is capable of being displayed over a network using a network browser.

9. The method according to claim 1, wherein the step of receiving user input to add information about the status of a location further comprises receiving information about the priority in which the information should be responded to by a third party.

10. The method according to claim 1, wherein the step of receiving user input to add information about the status of a location further comprises displaying a comment field on said display device for allowing entry of comments associated with the status of said location.

11. The method according to claim 1, wherein the step of receiving user inputs to add information about the status of a location further comprises receiving input from said user regarding one or more individuals to be contacted regarding the status of the location.

12. The method according to claim 11, further comprising transmitting a first notification signal to said one or more predetermined individuals regarding the status of the location.

13. The method according to claim 12, further comprising changing the appearance of an icon after said first notification signal has been sent.

14. The method according to claim 13, further comprising a second notification signal to a second predetermined group of one or more individuals regarding the status of the location if no response to the notifications to the first group of individuals has been received.

15. The method according to claim 14, further comprising changing the display of an icon after said second notification signal has been sent.

16. The method according to claim 14, wherein said second notification signal is transmitted after a predetermined period of time has elapsed after said first notification signal was transmitted.

17. The method according to claim 1, further comprising changing the display of an icon after determining a change in status for the corresponding location.

18. The method according to claim 1, wherein each said one or more icons is comprised of a plurality of display areas, each display area for displaying the status of an aspect of the location.

19. The method according to claim 1, wherein the physical locations are manufacturing locations within a factory.

* * * * *